(12) United States Patent
Miyashita et al.

(10) Patent No.: US 6,268,799 B1
(45) Date of Patent: Jul. 31, 2001

(54) LIGHT-SOURCE LAMP UNIT, LIGHT-SOURCE DEVICE AND PROJECTION-TYPE DISPLAY APPARATUS AND METHOD OF USE

(75) Inventors: Kiyoshi Miyashita; Kazuto Shinohara; Shinji Haba; Akitaka Yajima; Tomiyoshi Ushiyama, all of Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 08/981,006

(22) PCT Filed: Mar. 27, 1997

(86) PCT No.: PCT/JP97/01067
§ 371 Date: Dec. 10, 1997
§ 102(e) Date: Dec. 10, 1997

(87) PCT Pub. No.: WO97/38560
PCT Pub. Date: Oct. 16, 1997

(30) Foreign Application Priority Data

Apr. 10, 1996 (JP) .................................................... 8-88463
Apr. 30, 1996 (JP) .................................................... 8-109020

(51) Int. Cl.$^7$ .................................................... G08B 21/00
(52) U.S. Cl. .................................. 340/641; 340/638; 340/643
(58) Field of Search .................................. 340/641, 638, 340/654, 815.41, 815.73, 815.74, 815.75, 643; 324/410, 414; 600/323; 702/34; 355/67, 68, 69; 353/31, 33, 61

(56) References Cited

U.S. PATENT DOCUMENTS

| | | | |
|---|---|---|---|
| 3,849,759 | * 11/1974 | Hosaka et al. | 340/638 |
| 4,831,564 | * 5/1989 | Suga | 702/34 |
| 4,942,877 | * 7/1990 | Sakai et al. | 600/323 |
| 5,861,944 | * 1/1999 | Nishi | 355/68 |
| 5,951,136 | * 9/1999 | Furuhata et al. | 353/31 |

FOREIGN PATENT DOCUMENTS

| | | |
|---|---|---|
| 43 14 993 A1 | 11/1994 | (DE) . |
| 0 413 991 A1 | 2/1991 | (EP) . |
| 0 702 508 A1 | 3/1996 | (EP) . |
| 0 759 686 A2 | 2/1997 | (EP) . |
| 0 759 686 A3 | 12/1997 | (EP) . |
| 62-281297 | 12/1987 | (JP) . |
| 64-89186 | 4/1989 | (JP) . |
| 2-244089 | 9/1990 | (JP) . |
| 2-7373 | 10/1991 | (JP) . |
| 3-98436 | 10/1991 | (JP) . |
| 4-5622 | 1/1992 | (JP) . |
| 4-47698 | 2/1992 | (JP) . |
| 4-144754 | 5/1992 | (JP) . |
| 2-111013 | 6/1992 | (JP) . |
| 4-67691 | 6/1992 | (JP) . |
| 4-163584 | 6/1992 | (JP) . |

(List continued on next page.)

Primary Examiner—Van T. Trieu
(74) Attorney, Agent, or Firm—Oliff & Berridge, PLC

(57) ABSTRACT

A light-source lamp unit 100 includes a light-source lamp unit 1 detachably mounted, and CPU 101 constituting drive and control means for the light-source lamp unit. CPU 101 senses the lamp information borne by lamp-information storing block 5 in the light-source lamp unit 1, about a lamp power rating, lamp life and whether a lamp is new or not, and starts counting operation time when the lamp is lit. CPU 101 compares the lamp life sensed and the operation time count, and forces the lamp to extinguish when the life of the light-source lamp expires. Prior to this action, CPU 101 gives a warning display at a time that is earlier than the life expiration of the lamp by a fixed duration of time, to warn that a lamp replacement is needed. Since the lamp-information storing block 5 in the light-source lamp unit 1 stores the information about the lamp type and characteristics of the lamp, the light-source device 100 can properly drive the lamp to light it and determine the lamp life even when a light-source lamp unit of a different type is used.

24 Claims, 19 Drawing Sheets

FOREIGN PATENT DOCUMENTS

| | | |
|---|---|---|
| 4-250437 | 9/1992 | (JP) . |
| 4-323531 | 11/1992 | (JP) . |
| 5-2159 | 1/1993 | (JP) . |
| 6-89287 | 3/1994 | (JP) . |
| 6-89787 | 3/1994 | (JP) . |
| 5-27648 | 12/1994 | (JP) . |
| 6-86203 | 12/1994 | (JP) . |
| 7-306412 | 11/1995 | (JP) . |
| 8-62599 | 3/1996 | (JP) . |

* cited by examiner

|    | 150W  | 180W  | 1000 HRS | 3000 HRS | 6000 HRS |
|----|-------|-------|----------|----------|----------|
| B1 | ON 1  | OFF 0 | —        | —        | —        |
| B2 | —     | —     | ON 1     | OFF 0    | OFF 0    |
| B3 | —     | —     | OFF 0    | ON 1     | OFF 0    |
| B4 | —     | —     | OFF 0    | OFF 0    | ON 1     |

| LAMP | FUSE F1 | JUMPER WIRES | | | | POWER | LIFE t2 | TIME COUNT t1 | NEW / OLD |
|---|---|---|---|---|---|---|---|---|---|
| | | B1 | B2 | B3 | B4 | | | | |
| A | ○ | ○ | × | × | ○ | 150W | 3000h | | NEW |
| B | × | ○ | × | ○ | × | 150W | 6000h | | OLD |
| C | × | × | ○ | × | × | 180W | 1000h | 900h | OLD |

FIG. 5

(CROSS SECTION ALONG B-B)

LIGHT-SOURCE LAMP UNIT, LIGHT-SOURCE DEVICE AND PROJECTION-TYPE DISPLAY APPARATUS AND METHOD OF USE

This application is a 371 of PCT/JP97/01067 filed Mar. 27, 1997.

BACKGROUND OF THE INVENTION

1. Field of the Invention

The present invention relates to a light-source lamp unit that appropriately works as a light source for an optical apparatus such as a projection-type display apparatus which is capable of employing different types of light source. The present invention also relates to a light-source device having such a light-source lamp unit and a projection-type display apparatus having such a light-source device.

2. Description of the Related Art

Projection-type display apparatuses capable of projecting an enlarged image from a personal computer have been actively studied and developed. Such a projection-type display apparatus modulates an output light from a light-source lamp using a light valve such as a liquid-crystal display panel based on an image signal, and enlarges and projects the modulated light image on a projection screen through a projection lens.

Used as a light-source lamp for the projection-type display apparatus are a metal halide lamp, a xenon lamp, and a high-pressure mercury lamp. These light-source lamps emit a relatively stable light for a few thousand hours, but if they are used longer, the life of the lamp will expire, the quantity of light drops, and light intensity varies depending on wavelength, possibly degrading color balance. When the life of the lamp actually expires, a projected image is darkened and the color balance drops degrading image quality. To preclude such problems, it is necessary to replace the lamp before its life expires.

To avoid continuously using a lamp into its life-expired state, a mechanism for automatically warning that the lamp is approaching its expiration of life or a mechanism for forcibly blocking the use of the lamp expired have been proposed. For example, Japanese Unexamined Patent Publication Nos. 4-5622, 4-163584, 4-250437, and 4-323531 disclose such mechanisms.

In these mechanisms, the operation time count of the lamp should be measured, and when the lamp is replaced with a new one, the replacement has to be automatically detected to clear the time count value. Some mechanisms have been proposed for sensing automatically that an expendable item such as a lamp is replaced with a new one, wherein a fuse, attached to the expendable item such as a lamp, is employed such that it melts at the replacement of the item and the opening of the fuse by the melt is electrically detected to determine whether the expendable item is a new one. For example, mechanisms using such a fuse are proposed in Japanese Unexamined Patent Publication Nos. 4-144754 and 6-89287.

The technique proposed in the above disclosures assumes that the same type of lamp is usually used as the light source. In a diversity of optical apparatus, there will be times when lamps of different types and different output powers need to be selectively used depending on operational environments.

In the projection-type display apparatus, for example, the brightness of a projected image is subject to its upper limit when the same light-source lamp is used. Depending on operational environment, the projected image lacks brightness. For example, when a metal halide lamp is used as a light-source lamp, the display apparatus is designed to selectively employ lamps of 180 W and 100 W, and when a brighter projected image is needed, a 180 W lamp may be used.

With lamps of different characteristics, for example, of different output power, each lamp needs to be driven at driving condition appropriate to the characteristics of the lamp, and to this end, lamp drive and control circuits need to be replaced to match each lamp type. Such an method is not only inconvenient but also costly to run.

The 180 W metal halide lamp has a service life of 1000 hours or so while a low-power 100 W metal halide lamp has a longer service life of 6000 hours. In the projection-type display apparatus permitting lamps of different characteristics, if the techniques described in the above disclosures apply as they are, the service life of each lamp cannot be correctly determined and a display advising a lamp replacement cannot be presented in a timely manner, because the lamps are different from each other in service life. For example, when a 180 W metal halide lamp is replaced with a 100 W metal halide lamp after a fixed period of time of use, the operation time count for the current lamp is added to the operation time count for the first lamp, and then, the 100 W metal halide lamp is erroneously determined as a life-expired one, though it is not. Furthermore, when the 180 W metal halide lamp is replaced with the 100 W metal halide lamp, the 100 W metal halide lamp is sensed as a new one, and the operation time count of the 180 W metal halide lamp until then is cleared, and even if the same 180 lamp is used again, the operation time count is not considered in counting, and the opening of the lamp may suddenly take place before the determination of life expiration.

The lamps vary in color balance depending on their type, and a projected image of the projection-type display apparatus is maintained at its proper condition by the use of a lamp having a color balance that matches the type of the projected image and the operational environment. To this end, an arrangement is preferably provided to permit lamps of different types to be selectively used. Even in such an arrangement, however, the lamps of different types vary in life and lamp output power, and it is necessary to drive each lamp according to a driving condition appropriate to the lamp and to determine the life of the lamp depending on its type. The techniques proposed in the above disclosures fail to perform these functions.

A lamp drawing near to the end of life suffers a drop in luminance, and the luminance of the light source suddenly rises when the lamp is replaced with a new one. As a result, the projection-type display apparatus presents a sudden rise in brightness in the projected image, and a user has to manually adjust luminance each time the lamp is replaced. Manually adjusting the luminance of the light source at each lamp replacement is troublesome and inconvenient.

SUMMARY OF THE INVENTION

It is an object of the present invention to propose a light-source lamp unit free from the above conventional problems.

It is an object of the present invention to propose a light-source device, having the light-source lamp unit, free from the above conventional problems.

It is an object of the present invention to propose a projection-type display apparatus, having the light-source device, free from the above conventional problems.

To achieve the above objectives, the light-source lamp unit of the present invention comprises, in its organization, lamp-information storing means for storing lamp information about the type of a light-source lamp. With this arrangement, the lamp type is sensed by the light-source device of an optical apparatus in which the light-source lamp unit is mounted, and the light-source lamp unit is driven to light in optimal control in accordance with the lamp type. Light-source lamp units of different types are thus compatibly mounted on the same light-source device.

The light-source lamp unit of the present invention comprises, in its organization, lamp-information storing means for storing lamp information indicating the remaining life of the light-source lamp. The light-source lamp unit stores the information about the remaining life of the lamp, while the light-source device of the optical apparatus in which the light-source lamp unit is mounted senses the remaining life and the expiration time of the life of the light-source lamp is accurately determined.

The light-source lamp unit of the present invention comprises, in its organization, lamp-information storing means for storing lamp information indicating the life of the light-source lamp at the moment of the fresh start in use and lamp information indicating the operation time count of the light-source lamp. With this arrangement, the light-source device of the optical apparatus in which the light-source lamp unit is mounted senses the remaining life, and the expiration time of the life of the light-source lamp is accurately determined.

The light-source lamp unit of the present invention comprises, in its organization, lamp-information storing means for storing lamp information indicating the power rating of the light-source lamp. With this arrangement, when the power rating is sensed by the light-source device with a light-source lamp unit of a different power rating mounted on the light-source device of the optical apparatus, the light-source lamp unit is constantly driven to light at an appropriate power. Furthermore, the lamp-information storing means preferably stores information as to whether the light-source lamp is a new one or not.

The light-source lamp unit comprises the light-source lamp, a reflective mirror for reflecting a divergent light beam from the light-source lamp to output a parallel light beam, a lamp housing for supporting the reflective mirror, and an electrode lead that is led out of the end of an emission tube of the light-source lamp that is projected forward out of a reflective surface of the reflective mirror and that is connected to an external connection terminal board which is positioned to the rear side of the reflective surface of the reflective mirror. The electrode lead is preferably routed via the portion of the reflective mirror other than the effective reflective area of the reflective mirror. The terminal board is preferably supported at a position other than the reflective surface of the reflective mirror.

The present invention relates to the light-source device on which a light-source lamp unit is mounted, and the light-source device comprises the light-source lamp unit having the lamp-information storing means for storing the information about the type of the light-source lamp, sensing means for sensing the lamp information borne by the lamp-information storing means, memory means for storing the information about lamp power rating according to the type of the light-source lamp, and drive and control means for driving and controlling the light-source lamp based on the lamp information sensed by the sensing means, wherein the drive and control means retrieves the information about the lamp power rating corresponding to the type of the light-source lamp sensed and drives the light-source lamp at the lamp power. The light-source device of the present invention thus constructed uses compatibly light-source lamps of different power ratings.

The light-source device of the present invention comprises the light-source lamp unit having the lamp-information storing means for storing the lamp information indicating the remaining life of the light-source lamp, sensing means for sensing the remaining life of the light-source lamp borne by the lamp-information storing means, drive and control means for driving and controlling the light-source lamp based on the lamp information sensed by the sensing means, counting means for counting the operation time of the light-source lamp, and remaining life updating means for updating the information about the remaining life borne by the lamp-information storing means based on the operation time count given by the counting means, wherein the drive and control means drives the light-source lamp to light the light-source lamp only when the updated remaining life updated by the remaining life updating means is not zero. The light-source device thus constructed accurately determines the expiration time of the lamp life of each light-source lamp unit even if a plurality of light-source lamp units of the same type are interchangeably used. The light-source device uses compatibly a plurality of light-source lamp units.

The light-source device of the present invention comprises the light-source lamp unit having the lamp-information storing means for storing the lamp information indicating the life of the light-source lamp at the moment of the fresh start in use and the lamp information indicating the operation time count of the light-source lamp, sensing means for sensing the life and the operation time count of the light-source lamp borne by the lamp-information storing means, counting means for counting the operation time of the light-source lamp, comparing means for comparing the sum of the operation time count sensed by the sensing means and the operation time count given by the counting means with the life of the light-source lamp, drive and control means for driving the light-source lamp to light the light-source lamp only when the sum is shorter than the life, and updating means for updating the operation time count borne by the lamp-information storing means to the resulting sum. The light-source device thus constructed accurately determines the expiration time of the lamp life of each light-source lamp unit even if a plurality of light-source lamp units are interchangeably used.

The light-source device of the present invention comprises the light-source lamp unit having the lamp-information storing means for storing the information indicating the power rating of the light-source lamp, sensing means for sensing the lamp information, and drive and control means for driving and controlling the light-source lamp based on the lamp information sensed by the sensing means, wherein the drive and control means drives the light-source lamp at the sensed lamp power. The light-source device thus constructed performs lighting control at the power appropriate to the mounted light-source lamp unit.

The lamp-information storing means preferably stores information indicating whether the light-source lamp is a new one or not. The light-source device of the present invention comprises lamp life memory means for storing the information about the lamp life according to the type of the light-source lamp, counting means for counting the operation time of the light-source lamp, time count memory means for storing the operation time count counted by the counting means according to the type of the light-source lamp, and comparing means for comparing the lamp life of the light-source lamp with the operation time count of the light-source lamp, wherein the counting means resets the operation time count of the light-source lamp stored in the time count memory means when the light-source lamp is sensed as a new one, and then starts counting; and the drive and control means drives the light-source lamp to light the light-source lamp at the power of the light-source lamp sensed only when the comparison result given by the comparing means reveals that the operation time count of the light-source lamp is shorter than the lamp life of the light-source lamp. With this arrangement, the lighting control is optimally performed in accordance with the power rating and the life of the mounted light-source lamp unit.

In this case, the drive and control means preferably comprises luminance adjusting means for adjusting the luminance of the light-source lamp when the light-source lamp is sensed as a new one. With the luminance adjusting means, there is no need for a manual luminance adjustment at each lamp replacement.

To warn a user before the actual life expiration of the lamp that the lamp life expiration draws near, the light-source device of the present invention further comprises second comparing means for comparing a set time that is shorter than the lamp life of the light-source lamp by a fixed duration, with the operation time count, and warning means for warning that the light-source lamp draws near the end of its life when the comparison result given by the second comparing means reveals that the operation time count exceeds the set time.

To help the user to easily replace the light-source lamp unit with the one of a different type, the light-source device of the present invention preferably comprises a lamp unit mount for detachably mounting the light-source lamp unit, wherein the light-source lamp unit comprises a lamp housing that is assembled to the lamp unit mount.

The lamp-information storing means preferably stores information by the layout of a plurality of light reflective surfaces and non-reflective surfaces. In this case, the sensing means comprises photocouplers for optically sensing the light reflective surfaces and the non-reflective surfaces.

The light-source device comprises the light-source lamp, a reflective mirror for reflecting a divergent light beam from the light-source lamp to output a parallel light beam, a lamp housing for supporting the reflective mirror, and an electrode lead that is led out of the end of an emission tube of the light-source lamp that is projected forward out of a reflective surface of the reflective mirror and that is connected to an external connection terminal board which is positioned to the rear side of the reflective surface of the reflective mirror. The electrode lead is preferably routed via the portion of the reflective mirror other than the effective reflective area of the reflective mirror. The terminal board of the light-source lamp unit is preferably supported at a position other than the reflective surface of the reflective mirror.

The light-source device of the present invention is preferably used as a light source for a projection-type display apparatus. More specifically, the projection-type display apparatus of the present invention comprises the light-source device according to one of the light-source devices described above, modulation means for modulating an output light beam emitted by the light-source device according to an image signal, and projection means for projecting the modulated light beam to a projection surface.

In this case, the projection-type display apparatus of the present invention comprises warning means for warning that the remaining life of the light-source lamp is shorter than a preset time, wherein the warning means is screen brightness adjusting means for reducing the brightness of a projected image projected by the projection means by a predetermined level.

In addition to the above-described arrangement, the projection-type display apparatus, to which the present invention is applied, further comprises first and second lens plates, each having a structure of a plurality of lenses, and a light valve for modulating an output light beam from the second lens plate, wherein the output light from the light-source device is directed to each lens structure of the second lens plate as a secondary light-source image by the first lens plate. In this case, the light-source device preferably comprises the light-source lamp, a reflective mirror for reflecting a divergent light beam from the light-source lamp to output a parallel light beam, a lamp housing for supporting the reflective mirror, and an electrode lead that is led out of the end of an emission tube of the light-source lamp that is projected forward out of a reflective surface of the reflective mirror and that is connected to an external connection terminal board which is positioned to the rear side of the reflective surface of the reflective mirror. The electrode lead is routed via the portion of the reflective mirror other than the effective reflective area of the reflective mirror, and wherein the portion of the electrode lead positioned on the side of the reflective surface of the reflective mirror is arranged along a groove of the structure of the plurality of lenses of the first lens plate. Furthermore the terminal board of the light-source lamp unit is preferably supported at a position other than the reflective surface of the reflective mirror.

The light-source lamp unit of the present invention comprises a light-source lamp, and lamp-information storing means for storing information indicating whether the light-source lamp is a new one or not. The lamp-information storing means comprises a fuse, which indicates, by the melted-open state or closed state, whether the light-source lamp is a new one or not.

The light-source device provided with the light-source lamp unit thus constructed comprises sensing means for sensing the information borne by the lamp-information storing means, and setting means that melts the fuse and sets the information stored by the lamp-infomation storing means to be indicative of not a new lamp, when the sensing means senses that the light-source lamp is a new one.

The light-source device further comprises counting means for counting the operation time of the light-source lamp, memory means for storing the operation time count of the light-source lamp counted by the counting means, and comparing means for comparing the operation time count with a preset time, wherein the light-source lamp is lit only when the operation time count is shorter than the preset time; since the light-source device is permitted to use the light-source lamp until a moment prior to the expiration of the lamp life, the continuous use of the light-source lamp into life-expired state is prevented. Alternatively, the light-source lamp may be designed to be extinguished when the operation time count exceeds the preset time, to prevent the continuous use of the light-source lamp into the life-expired state.

The light-source device preferably comprises reset means for resetting the operation time count to an initial default value when the sensing means senses that the light-source lamp is a new one. Furthermore, luminance adjusting means conveniently frees the user from a manual luminance adjustment at each lamp replacement.

BRIEF DESCRIPTION OF THE DRAWINGS

FIG. 5 is a table showing the relationship of the types of lamps, the states of the lamp-information storing block, and the memory content of a memory in the light-source device;

DETAILED DESCRIPTION OF PREFERRED EMBODIMENTS

Figure 1A:
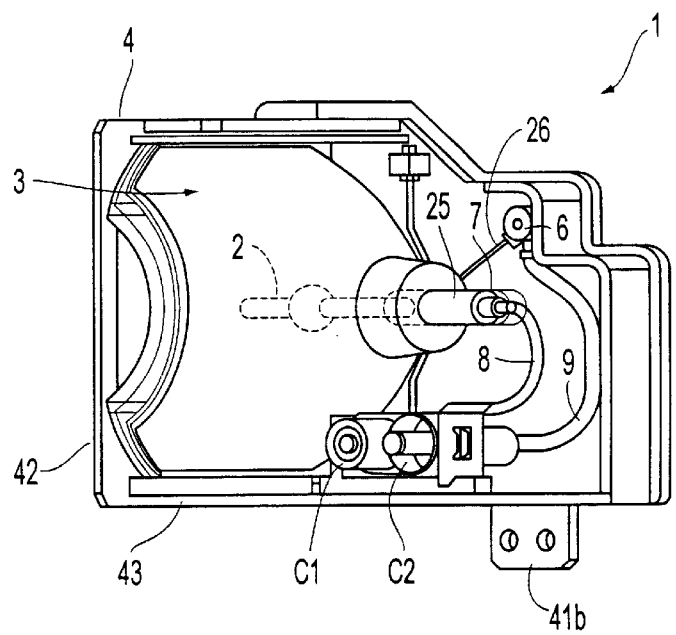
FIG. 1(A) is a rear perspective view of a light-source lamp unit in which the present invention is implemented, viewed from diagonally upward position above the unit.

Referring now to the drawings, a light-source lamp unit, a light-source device, and a projection-type display apparatus of the present invention are discussed.
(Light-source lamp unit)

Figure 1B:
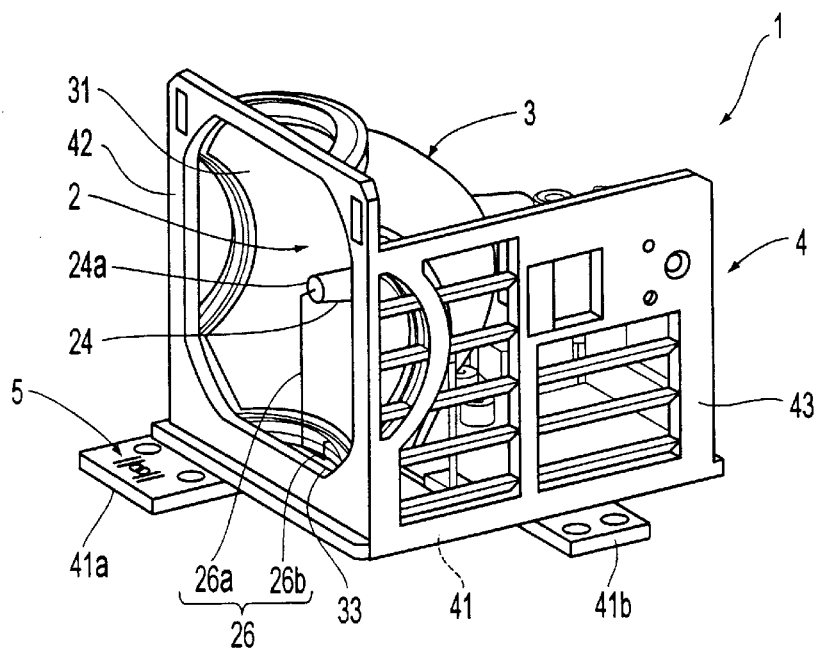
FIG. 1(B) is a front perspective view of the light-source lamp unit, view d from a diagonally upward position above the unit.
Figure 2A:
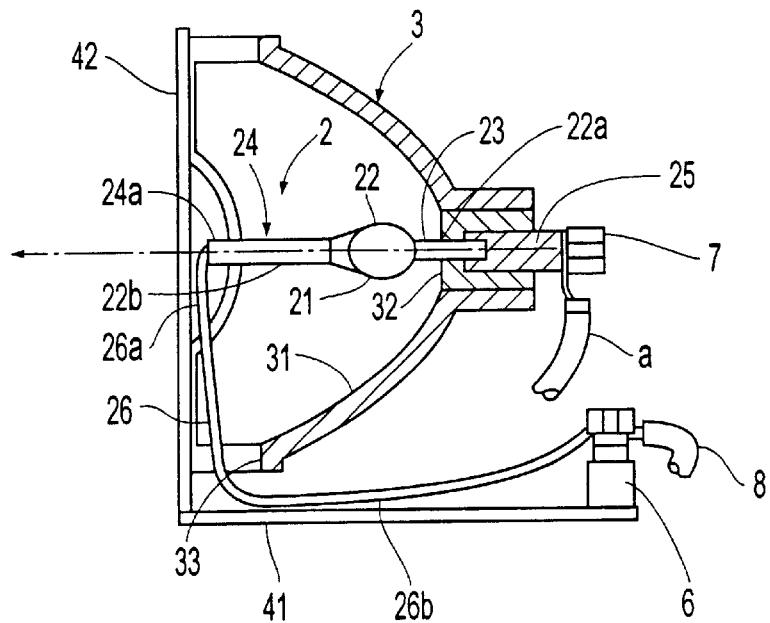
FIG. 2(A) is a longitudinal sectional view of the light-source lamp unit of FIG. 1.
Figure 2B:
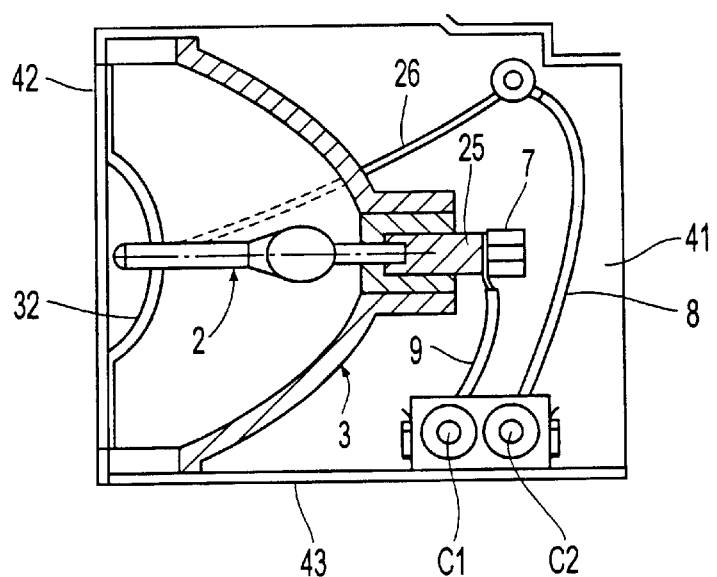
FIG. 2(B) is a cross-sectional view of the light-source lamp unit.

FIGS. 1(A) and 1(B) are respectively rear and front perspective views of the light-source lamp unit of the present invention. FIGS. 2(A) and 2(B) are respectively longitudinal and cross-sectional views of the light-source lamp unit.

Referring to these drawings, the light-source lamp unit 1 comprises a light-source lamp 2, a reflective mirror 3 to which the light-source lamp 2 is mounted, a housing 4 for containing the light-source lamp 2 and reflective mirror 3, and a lamp-information storing block 5 attached to the housing 4.

The light-source lamp 2 is a metal halide lamp, for example, and an emission tube 21 is manufactured of silica glass. An emitter section 22 formed in the center of the emission tube 21 is of a nearly circular ellipsoid, and electrode seals 23, 24 are integrally formed with the emitter section 22 on both sides respectively, and electrode core bars 22a, 22b are collinearly arranged inside the emitter section 22. The ends of the electrode core bars 22a, 22b face with each other with a fixed spacing kept therebetween. The other ends of the electrode core bars 22a, 22b are sealed in the electrode seals 23, 24, respectively. Occasionally, a coil (not shown) formed of a compactly wound tungsten wire is arranged on the end of each of the electrode core bars 22a, 22b. The supporting ends of the electrode core bars 22a, 22b are respectively connected to a base 25 and a nickel lead 26 via molybdenum films.

The reflective mirror 3 is provided with a reflective surface 31 having a parabolic shape in cross section, and a lamp mounting hole 32 is formed in the deepest inside portion of the reflective surface 31. The base 25 of the light-source lamp 2 is inserted into the lamp mounting hole 32, and bonded there by a heat-resistant adhesive. The light-source lamp 2 is designed such that the axes of the electrode core bars 22a, 22b are nearly aligned with the center line of the reflective surface 31. The seal 24 on one end of the emission tube 21 of the light-source lamp is thus projected frontward out of the reflective surface 31 along its center line.

The nickel lead 26 connected to the electrode core bare 22b at the end 24a of the seal 24 is bent almost at a right angle at the end 24a downward, and has a portion 26a extending downward to the lower peripheral portion 33 of the reflective mirror 3 and a portion 26b which is continuously extended from the lower end of the portion 26a, and is routed rearward under the lower peripheral portion 33 of the reflective mirror 3. The end of the portion 26b is connected to the terminal board 6 for external connection mounted on the rear end of the housing 4. The base 25 is provided with a terminal board 7 for external connection. The terminal boards 6, 7 are respectively connected to leads 8, 9. The leads 8, 9 are respectively connected to connectors C1, C2 for external connection.

The housing 4 includes a bottom plate 41, a front frame 42 and a side plate 43, and the bottom plate 41 is provided with flanges 41a, 41b for detachably mounting the light-source lamp unit 1 as will be described later. These flanges 41a, 41b allow the light-source lamp unit to be detachably mounted to a mounting portion of the optical apparatus using fixing bolts (not shown). The lamp-information storing block 5 is also mounted on the surface of the flange 41a on the front of the housing 4.

Figures 3A, 3B:
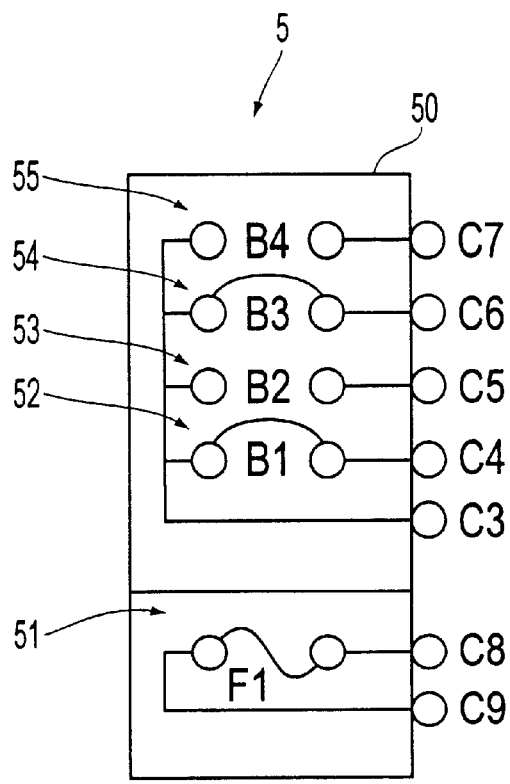
FIG. 3(A) is a diagram showing the construction of a lamp-information storing block in the light-source lamp of FIG. 1.
FIG. 3(B) is a table illustrating the content of information in the lamp-information storing block.

FIG. 3(A) shows the construction of the lamp-information storing block 5 of this embodiment. As shown, the lamp-information storing block 5 comprises a circuit board 50, a pair of fuse terminals 51 arranged on the circuit board, and four pairs of jumper wire terminals 52–55 on the circuit board 50. A fuse F1 is connected between the fuse terminals 51, which are respectively connected to output terminals C8, C9. Jumper wires B1–B4 (only B1 and B3 are shown in FIG. 3(A)) are connected between respective pairs 52–55 of jumper wire terminals. The terminals of the jumper wire terminal pairs 52–55 at one side are connected to output terminals C4–C7, respectively, and the other sides of the terminals 52–55 are connected to a common terminal C3 for ground.

The fuse F1 is a portion for storing the information indicating whether the light-source lamp unit 1 is a new one. The light-source lamp unit is shipped with the fuse terminals 51 connected with the fuse F1 therebetween. If the optical apparatus employing the light-source lamp unit 1 is provided with a sensing circuit for sensing whether there is a continuous conductive path between the pair of output terminals C8, C9, the presence or absence of the continuous conductive path between these terminals indicates whether the light-source lamp unit 1 is a new one or not. If the optical apparatus is provided with an electric circuit capable of supplying an excessive current between these terminals, and if the fuse F1 is melted by the excessive current when the light-source lamp unit 1 is freshly used, the terminals thereafter remain in a non-conducting state, helping sense that the light-source lamp unit 1 is not a new unit.

The jumper wires B1–B4 are a portion for storing the type information about each light-source lamp unit 1. Depending on which jumper wires 52–55 are connected, several pieces of information may be obtained. FIG. 3(B) shows one example. In the table in FIG. 3(B), whether a jumper wire B1 is connected or not (ON or OFF, respectively) discriminates between two types of light-source lamps, namely a 150 W power lamp and a 180 W power lamp. ON/OFF states of the remaining jumper wires B2–B4 identify which lamp life, 1000 hours, 3000 hours or 6000 hours, the light-source lamp unit 1 has.

Depending on the type and characteristics of the light-source lamp 2 mounted, which jumper wires B1–B4 to connect between the respective jumper wire terminal pairs 52–55 are decided, and a manufacturer sets the ON/OFF states of the terminal pairs prior to shipment of the light-source lamp unit 1. If the optical apparatus having the light-source lamp unit 1 senses the opened or closed states of the jumper wire terminals 52–55 from the output terminals C4–C7, the type and life of the light-source lamp unit 1 are thus sensed.

In the light-source lamp unit 1 as already described, the lead 26 led out of the electrode core bar 22b of the light-source lamp 2 is routed around the reflective mirror 3 and reaches the rear side of the reflective mirror 3, rather than being inserted through the reflective mirror 3. The reflective mirror 3 needs therefore no through-hole for passing the lead 26 therethrough. Unlike a conventional art, the reflective surface is free from a deformation around a through-hole in the formation process of the reflective mirror 3 or in the routing process of the lead 26 rearward through the through-hole drilled in the reflective surface. Although no through-hole for the lead 26 is formed in the central portion of the reflective mirror 3, a through-hole may be drilled in the portion of a reflective surface 31 of the reflective mirror 3 outside its effective reflective surface, for example, in the peripheral portion of the reflective surface 31. In this case, such a through-hole will be perfectly acceptable unless the effect of the through-hole drilled adversely affects the effective reflective surface of the reflective mirror. The present invention therefore does not exclude the arrangement in which the through-hole for the lead is drilled in the portion of the reflective mirror outside the effective reflective area of the reflective mirror. When the lead 26 is routed as described above, the length of the lead is long, and preferably it is clamped on its way so that the lead is not loosely moved. For example, a lead clamp section may be attached to the lower peripheral portion 33 of the reflective mirror 3. The lead may be clamped at anywhere else other than the lower peripheral portion 33.

The lead 26 routed to the rear side of the reflective mirror 3 is connected to the terminal board 6 for external connection mounted on the housing 4. When the terminal board 6 is fixed on the rear surface of the reflective mirror 3 as in the conventional art, the mounting portion for the terminal board 6 is exposed to high temperature from the lamp lit, thermal stress takes place there due to differing thermal expansion coefficients between the glass forming the reflective mirror and the metal material of the terminal board, and a crack may develop there, possibly leading to a break. Since the terminal board 6 is mounted on the housing 4 rather than on the reflective mirror 3, no such damage occurs. The terminal board 6 may be fixed to one side surface of the housing 4 rather than on the bottom surface of the housing 4. It is important that the terminal board 6 be mounted at a position other than on the reflective surface of the reflective mirror 3.

(Light-source device)

Figure 4A:
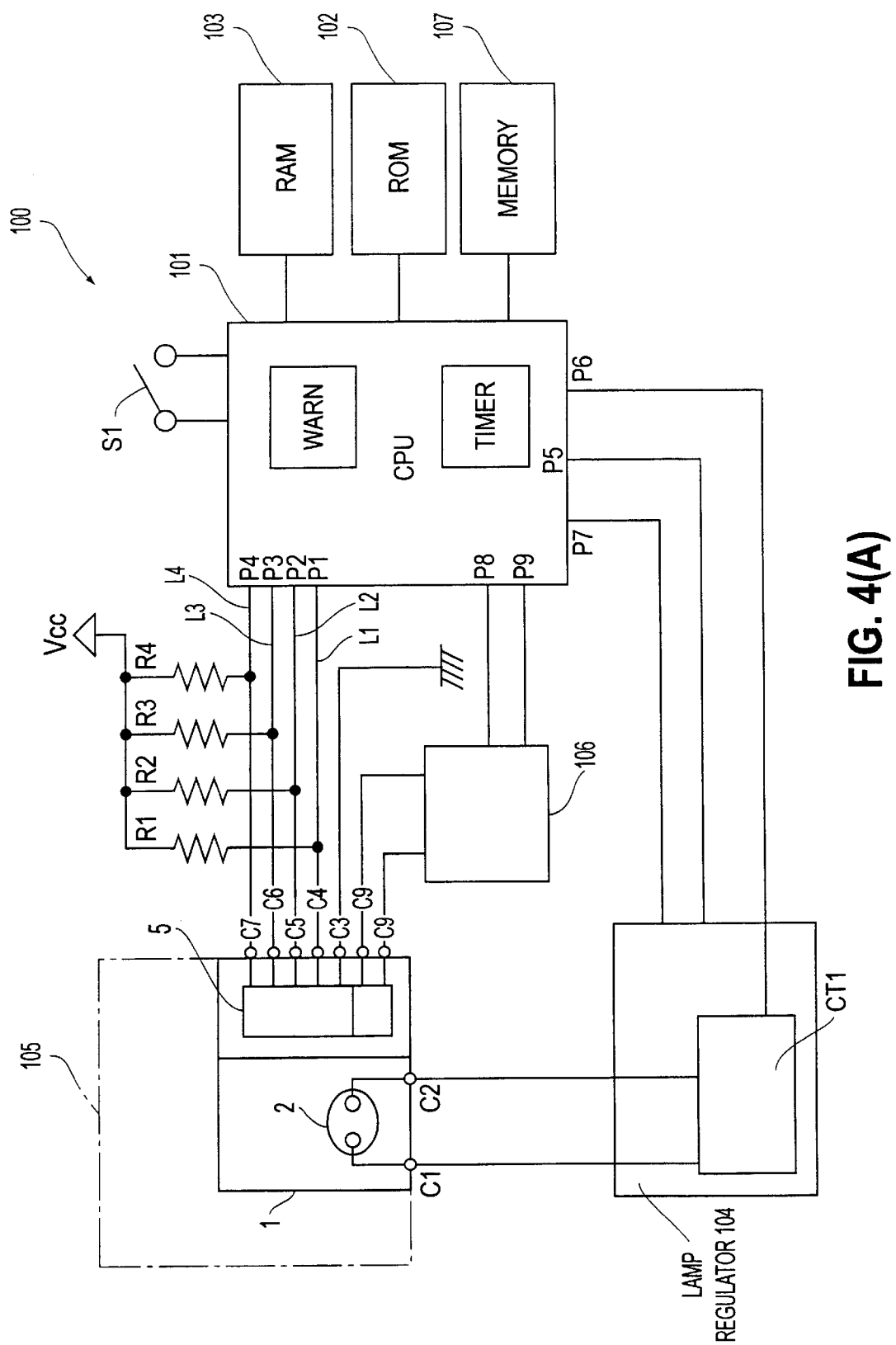
FIG. 4(A) is a diagram of a control system for a light-source device in which the light-source lamp of FIG. 1 is mounted.

Discussed now is the light-source device of the present invention provided with the light-source lamp unit 1 thus constructed. FIG. 4(A) is a block diagram of the light-source device 100. As shown, the light-source device 100 comprises CPU 101, ROM 102 for storing a variety of control programs, RAM 103 serving as a work area when a program is being executed, a lamp regulator 104 for driving the light-source lamp unit 1 to light it under the control of CPU 101, a lamp unit mount 105 on which the light-source lamp unit 1 is detachably mounted, and a fuse melting circuit 106. Also provided is a memory 107 that is nonvolatile or powered by a backup battery, and holds information such as operation time count of the light-source lamp unit as will be described later. A switch S1 is turned to ON/OFF interlockingly with the lighting/extinction of a lamp 2 of the light-source lamp unit 1.

The lamp unit mount 105 is provided with corresponding connection terminals (not shown) that are respectively connected to terminals C1–C9 of the light-source lamp unit 1 when the light-source lamp unit 1 is mounted thereon. Terminals C4–C7 of the light-source lamp unit 1 are connected to respective input ports P1–P4 of CPU 101 via respective signal lines L1–L4 connected to a power supply Vcc via respective pull-up resistors R1–R4, and C3 is grounded. Terminals C8 and C9 are connected to the fuse melting circuit 106, and lamp power supplying terminals C1 and C2 are connected to the lamp regulator 104. The fuse melting circuit 106 in turn is connected to input/output ports P8 and P9 on CPU 101, and the lamp regulator 104 is connected to input/output ports P5–P7 on CPU 101.

Figure 4B:
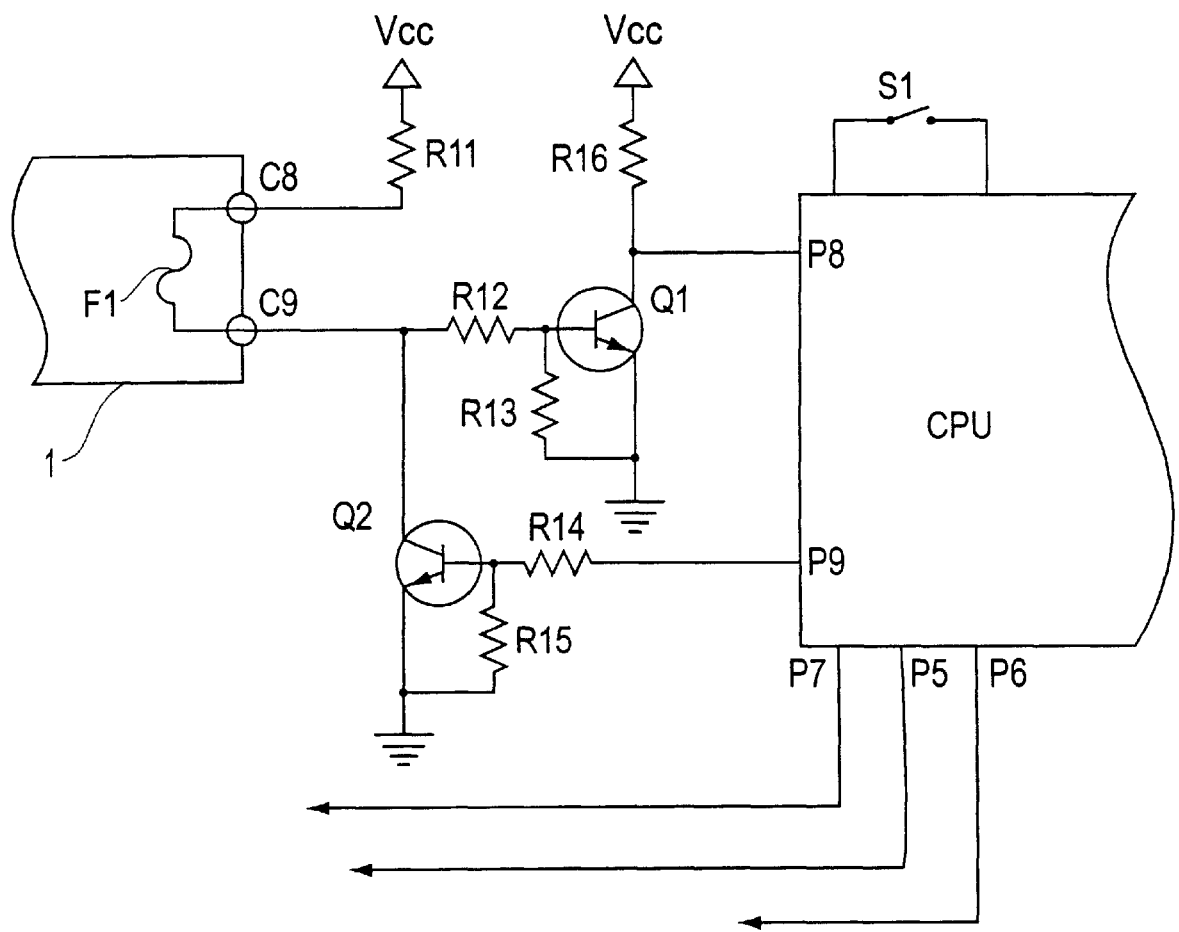
FIG. 4(B) is a schematic diagram of a fuse melting circuit constituting the control system.

FIG. 4(B) is a schematic diagram of the fuse melting circuit 106. As shown, the terminal C8 of the fuse F1 of the light-source lamp unit 1 is connected to the power supply Vcc, and the other terminal C9 is connected to a transistor Q1. When the power supply Vcc is turned on with the fuse F1 electrically conducting, the transistor Q1 is turned on, driving the voltage level at the input port P8 low to "0". When the output port P9 on CPU 101 is driven high to "1", a transistor Q2 is turned on, causing a current to flow through the fuse F1 and thus melting the fuse F1. R11–R16 denotes resistors.

The lamp lighting control operation of the light-source device 100 is now discussed. It is assumed that three types (A, B, and C) of light-source lamp units 1 are usable as shown in a table in FIG. 5. A unit A is a 150 W power lamp having a lamp life of 3000 hours, and is a brand-new unit never used before. A unit B is a 150 W power lamp having a lamp life of 6000 hours, and has already been used. A unit C is a 180 W power lamp having a lamp life of 1000 hours, and has already been used. In this case, the nonvolatile memory 107 stores these pieces of information, and further stores the past operation time counts for the units B and C.

Figure 6A:
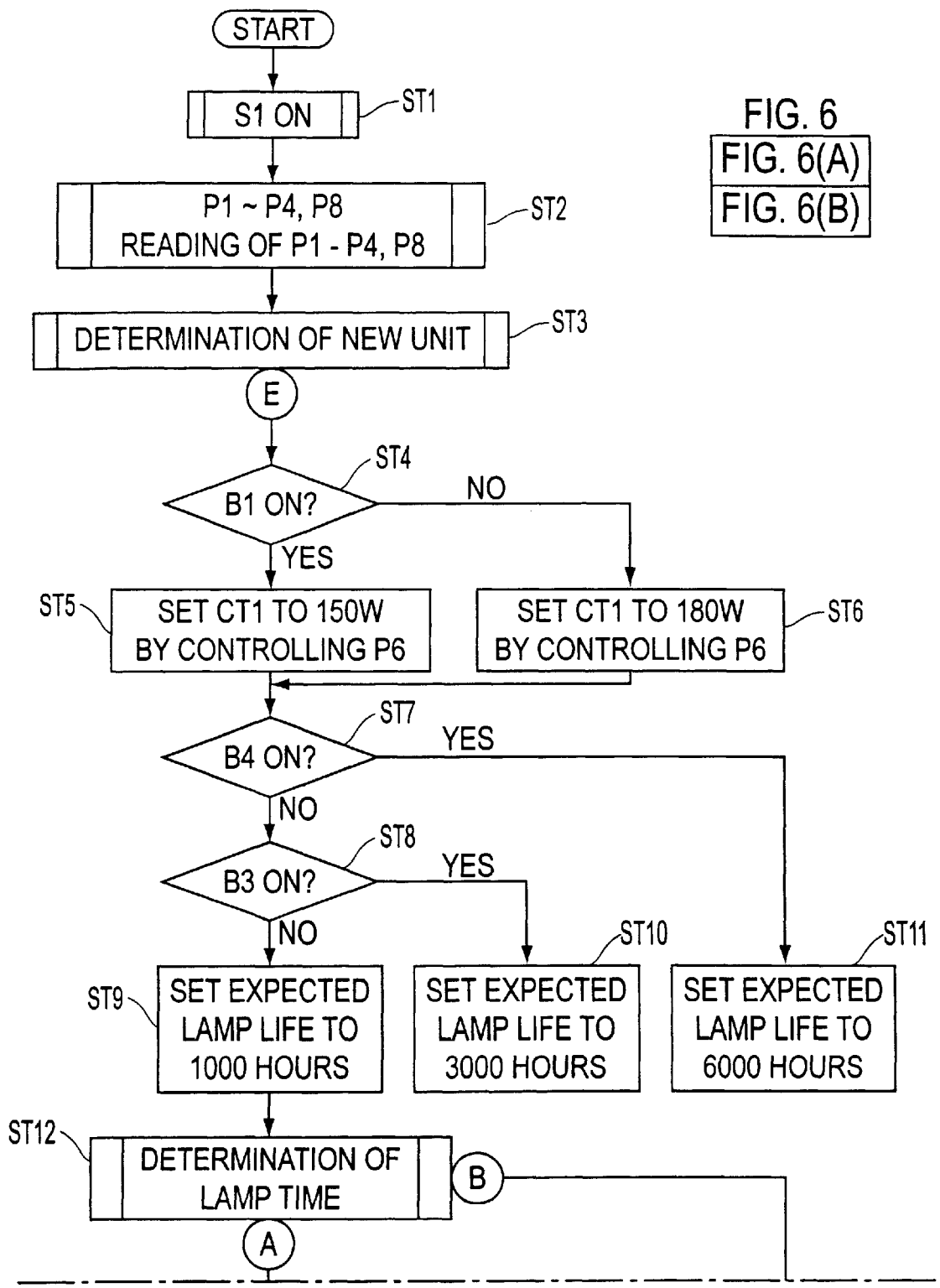
FIG. 6 is a flow diagram showing the operation of the light-source device.
Figure 6B:
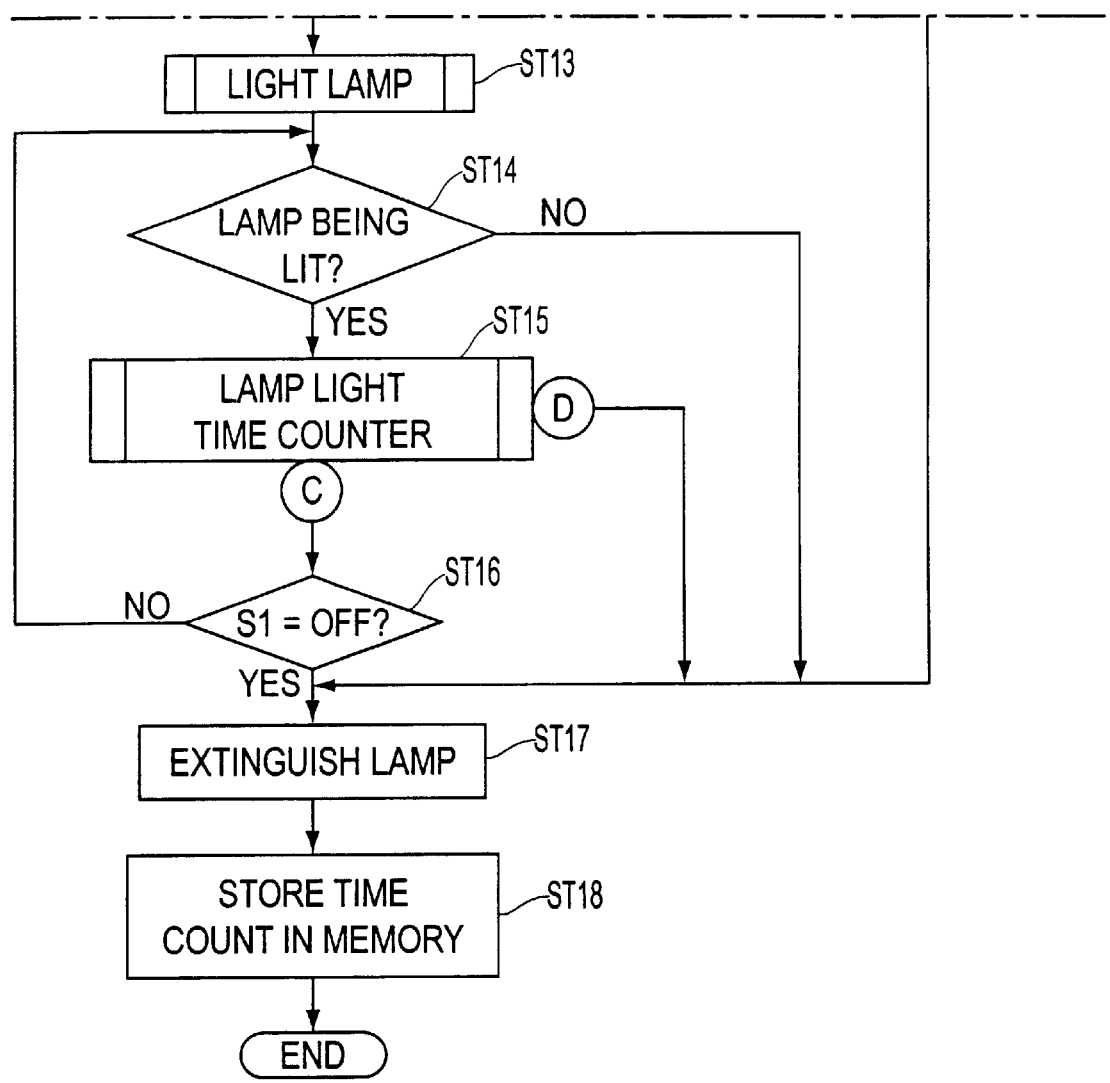

Referring to FIG. 6, the lighting control operation of the light-source device 100 when the new unit A is selected out of the three units A–C is now discussed. When the power switch of the light-source lamp unit A is turned on, the switch S1 is turned on, and the states at the input ports P1–P4 and P8 are read (steps ST1, ST2).

Figure 7:
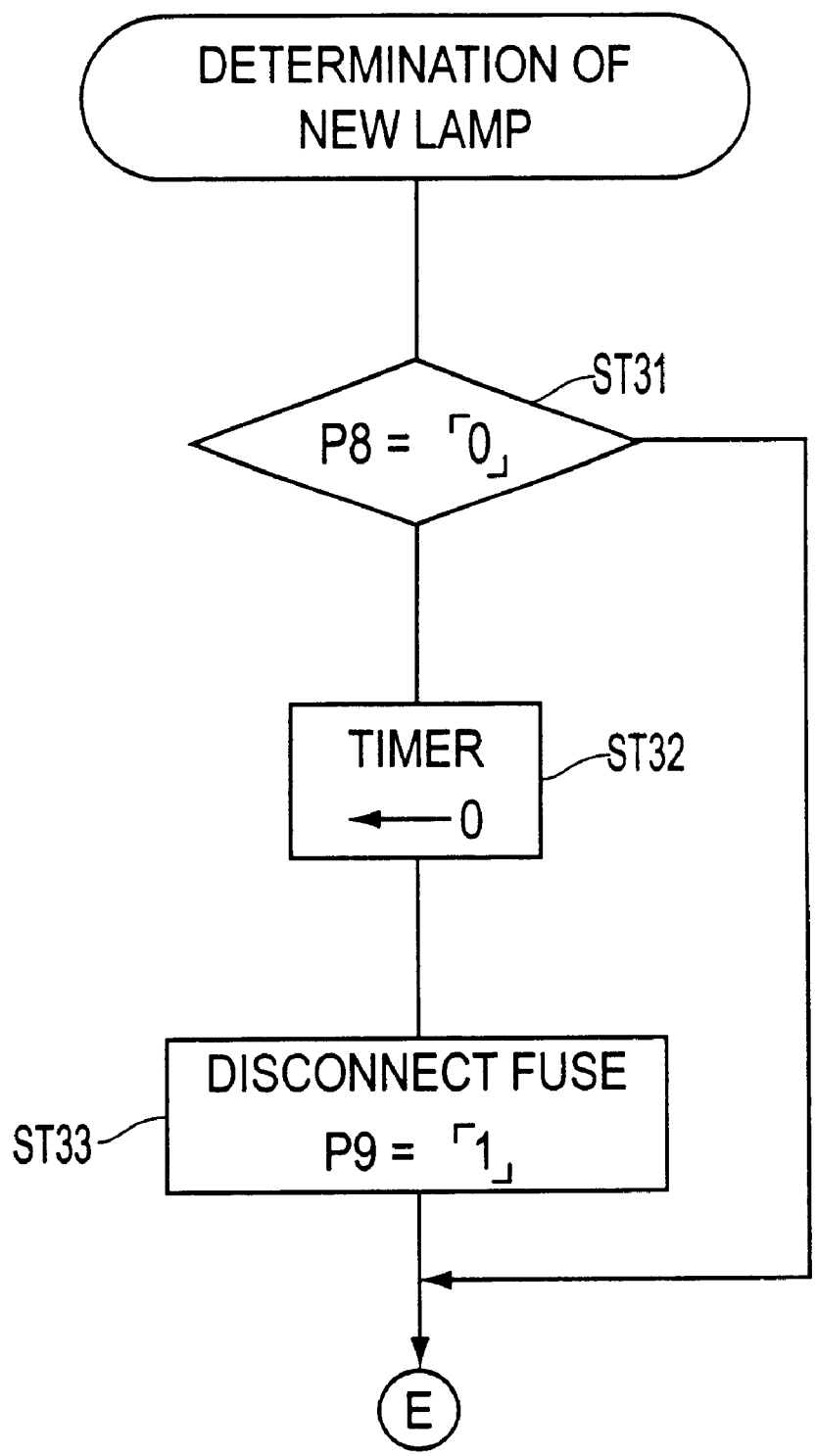
FIG. 7 is a flow diagram showing the process for determining a,new lamp in the flow diagram of FIG. 6.

A determination is made of whether the light-source lamp unit A is a new one, based on the determination as to whether the state at the input port P8 is "0" (step ST3). With reference to a flow diagram shown FIG. 7, the unit A is a brand-new unit, the fuse F1 is at its connected state, and when the switch S1 is turned on, the voltage level at the input port P8 is driven high to "1" (step ST31). The operation time count given by a counting timer function provided by CPU 101 for counting the lamp operation time is reset to zero (step ST32). More particularly, the operation time count held heretofore in the memory 107 is cleared. The output port P9 is driven high to "1", turning the transistor Q2 on, causing an excessive current to flow through the fuse F1 and thereby melting the fuse F1 (step ST33, refer to FIG. 4(B)). When the fuse F1 is melted, the level at the input port P8 is driven low to "0". When the input port P8 is at "0", the light-source lamp unit is determined to be a used one, and when the input port P8 is at "1", the light-source lamp unit is determined to be a new one.

Returning to the flow diagram in FIG. 6, after the determination of whether the unit is new or old, the lamp power is determined based on the state at the input port P1, namely based on the determination as to whether the jumper wire B1 is connected on the lamp-information storing block 5 in the light-source lamp unit A, and CPU 101 controls a power control circuit CT1 in the lamp regulator 104 via its output port P6 so that the light-source lamp unit A is lit at the sensed lamp power (steps ST4, ST5, and ST6). A lamp power rating of 150 W is selected because the light-source lamp unit 1 is set to a lamp power of 150 W with the jumper wire B1 at its connected state.

The lamp life is then sensed referring to the states at the output ports P3, P4. More particularly, depending on whether the jumper wires B3, B4 are connected, the lamp life is sensed (steps ST7–ST11). Although sensing the lamp life based on the states of the output ports P2–P4 is perfectly acceptable, the lamp life can be determined based on the states of two ports only out of the three ports in this embodiment as shown in FIG. 5.

In this way sensing the states of the input ports determines which type of unit, A through C, is mounted as the light-source lamp unit 1. In this case, it is determined that a new light-source lamp unit A is mounted.

Figure 8:
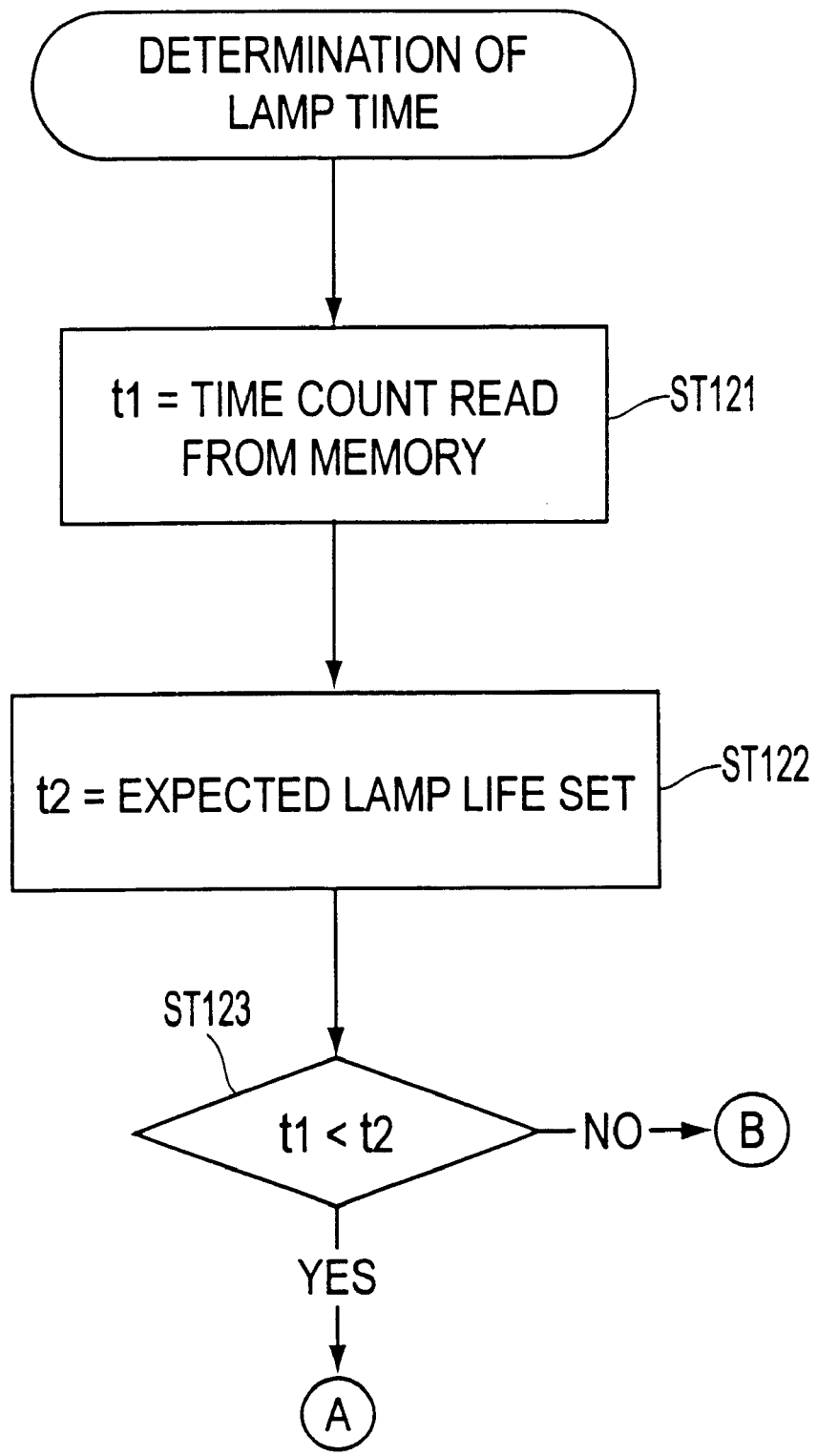
FIG. 8 is a flow diagram showing the process for determining lamp time in the flow diagram of FIG. 6.

A lamp time determination process is then performed to determine whether the lamp life expires (step ST12). As shown in FIG. 8, in this step, an operation time count t1 of the unit A is read from the memory 107 and expanded into a predetermined register in RAM 103 (step ST121). The lamp life t2 of the unit A is next read and expanded into a register in RAM 103 (step ST122). A determination is made of whether the operation time count t1 is shorter than the lamp life t2 (step ST123). Since the unit A is new here, the operation time count t1 is zero, and control sequence flows from step ST123 to "YES".

Returning to the flow diagram in FIG. 6, after the determination of whether or not the lamp life expires, the sequence goes to step ST13 to light the lamp unless the lamp life expire. Steps ST14–ST16 are repeated thereafter until the switch S1 is turned off. More particularly, the lamp operation time is counted by the counting timer function provided by CPU 101, and is used to update the operation time count held in the register for operation time count storing in RAM 103. At the same time, a life warning display control process is performed as shown in FIG. 9.

Figure 9:
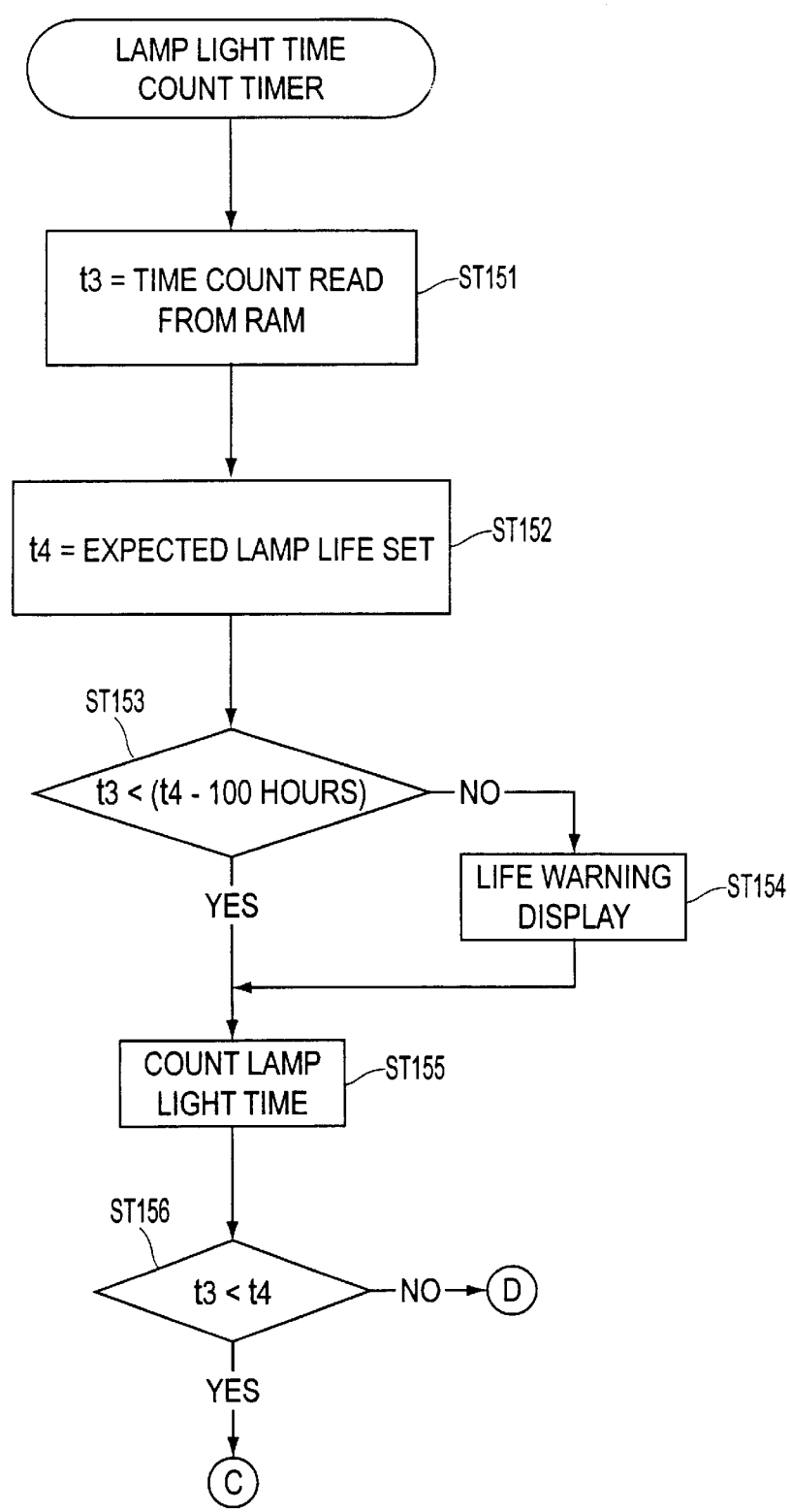
FIG. 9 is a flow diagram showing the operation of a light-source lamp light time counting timer in the flow diagram of FIG. 6.

In the life warning display control process shown in FIG. 9, both the operation time constant t3 and the lamp life t4 are read from RAM 103 (steps ST151 and ST152) to determine whether the lamp operation time t3 is shorter than the lamp life t4 by 100 hours (step ST153). If the time t3 is shorter than the time t4 minus 100 hours, the sequence goes to step ST155, where operation time counting is performed, and then returns to the control flow in FIG. 6. When the operation time count exceeds the lamp life minus 100 hours, a life warning display operation is initiated to warn the user that the lamp life is expected to expire soon (step ST154). Since the new unit A is mounted here, no life warning display is presented. Through steps ST155 and ST156, the sequence returns to the control flow in FIG. 6.

In step ST16 in FIG. 6, when the switch S1 is turned off in step ST16, the sequence goes to steps ST17 and then ST18, where the operation time count t1 is updated to t3 in memory 107, and the sequence ends.

When the light-source lamp unit C, once used in the lamp unit mount 105, is mounted, the operation takes the following sequence. It is now assumed that the light-source lamp unit C reaches the operation time count t1 of 900 hours against its lamp life of 1000 hours.

Referring to the flow diagram in FIG. 6, the unit is determined to be not a new unit in step ST3 because the fuse F1 is already melted open in the light-source lamp unit C. As a result, the operation time count t1 held in the memory 107 is continuously stored without being cleared. The lamp power of 180 W is sensed in step ST6, and the lamp life of 1000 hours is sensed in step ST9. Since the operation time count is found to be longer than the lamp life minus 100 hours in step ST15, the life warning display is presented as shown in FIG. 9.

In one form of the life warning display, the luminance of the light source may be reduced by controlling the lamp regulator 104 to lower the driving power for the lamp. In another form of the life warning display, the light source may blink on and off. The light-source device, if provided with a display screen, may present a visual display indicating that the life expiration draws near. The light-source device, if provided with an audio visual display function, may present an audio visual message indicating the life expiration draws near. Furthermore, the optical apparatus to which the light-source device 100 is mounted is a projection-type display apparatus, reducing the brightness of the projection screen is contemplated in one form of the life warning, or presenting on a corner of the projection screen a display indicating that the life is expected to expire soon in another form of life warning. The projection-type display apparatus itself may present a warning display on its body. Since, prior to the life expiration, this embodiment warns the user that the lamp life is expected to expire soon to help the user to be prepared for that, for example, by keeping a new lamp handy.

If no lamp replacement is performed regardless of the continuous or continual life warning display, the operation time count t3 reaches the lamp life t1. When the operation time count reaches the lamp life, the sequence jumps from step ST12 or ST15 to step ST17 where the light-source lamp unit 1 is forced to extinguish as shown in FIG. 6. With this arrangement, the lamp unit is prevented from being used into the life-expired state.

Besides the above functions, the light-source device 100 is preferably provided with a function that allows the luminance of a new lamp 2 to be automatically adjusted when the lamp 2 is replaced. For example, when the warning of life expiration is given, the luminance of the lamp 2 is stored. When the new one in place of the old one is lit, the luminance of the lamp is automatically adjusted under the control of CPU 101 so that no substantial luminance change between before and after replacement occurs.

(First modification of the light-source device)

Figure 10A:
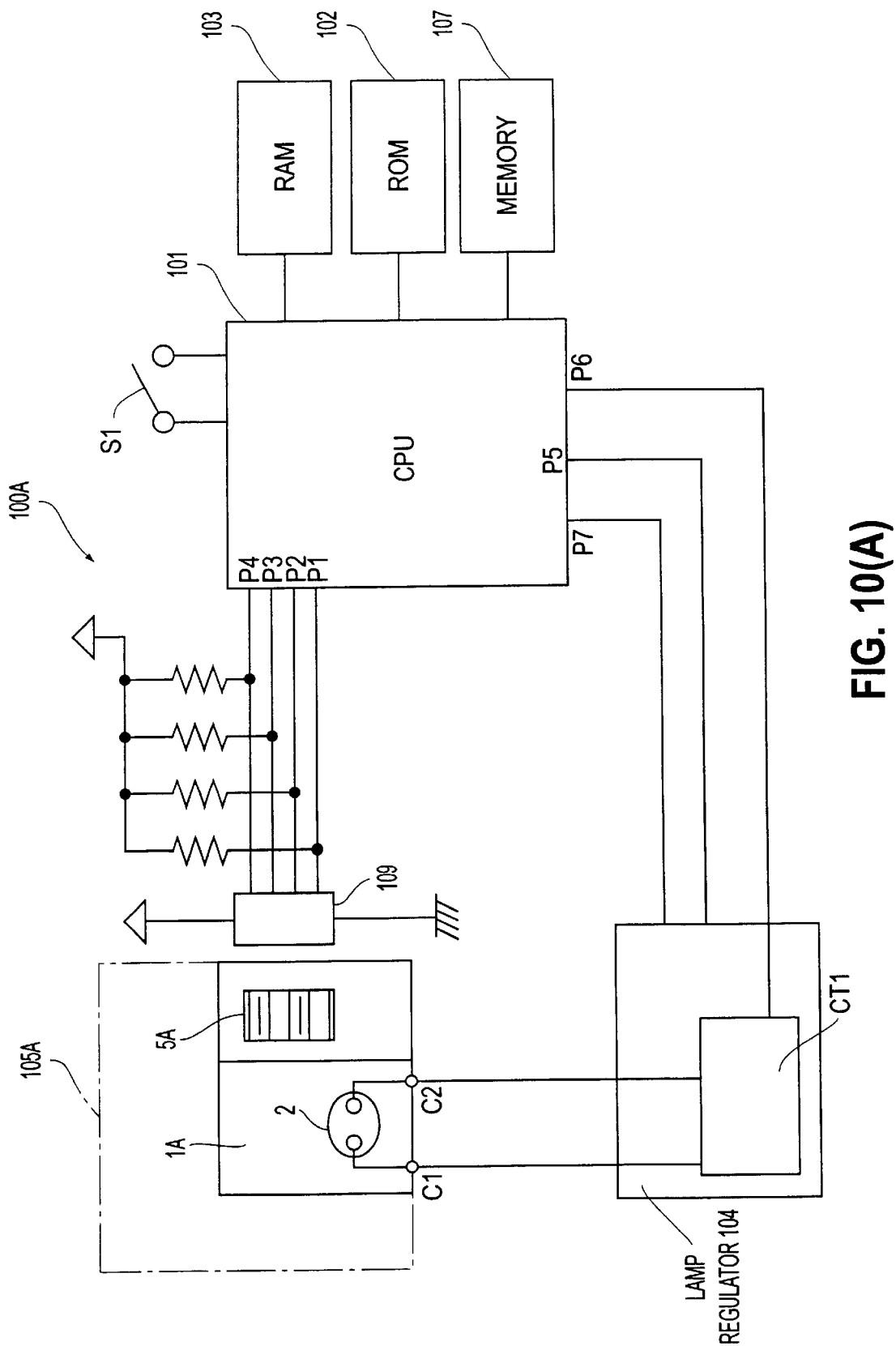
FIG. 10(A) is a block diagram showing a modification of the control system for the light-source device of FIG. 4.
Figure 10B:
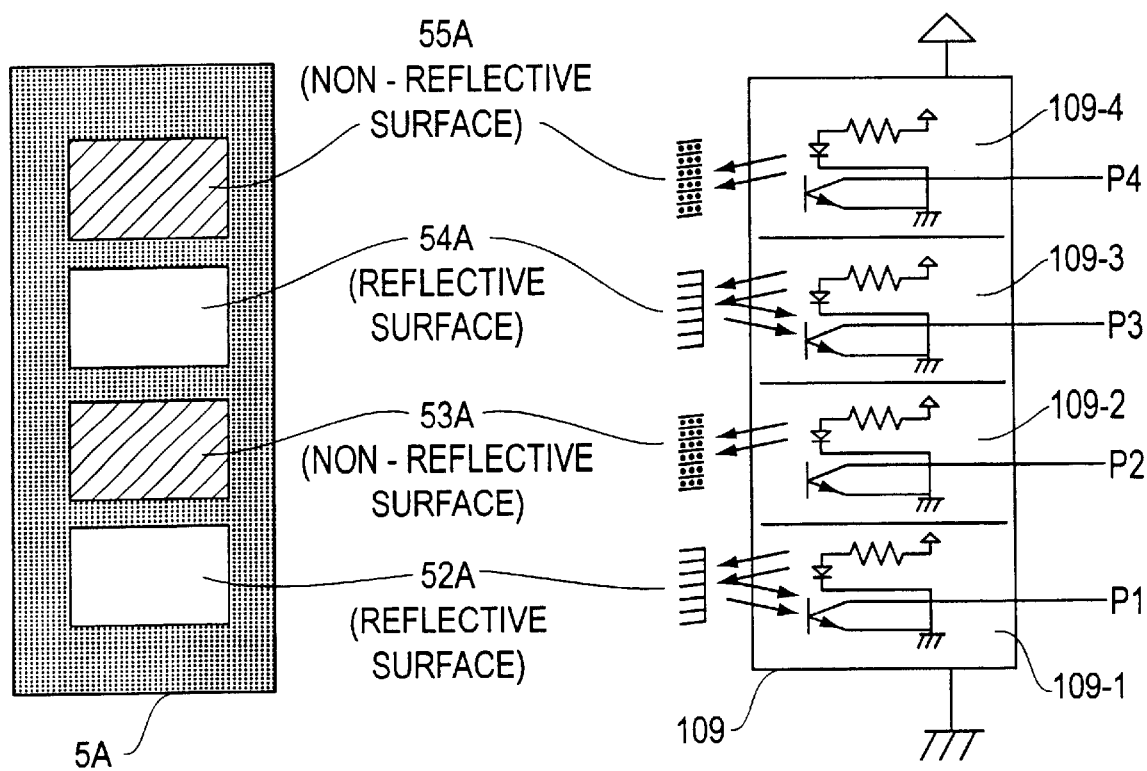
FIG. 10(B) is an explanatory diagram showing the construction of the lamp-information storing block and its sensor unit.

FIG. 10 shows one modification of the light-source device 100. A light-source device 100A of this modification is different in the construction of a lamp-information storing block 5A in a light-source lamp unit 1A and a lamp unit mount 105A for sensing the information obtained by the lamp-information storing block 5A, and the rest of the construction of the light-source device 100A remains the same as that of the light-source device 100. The different portions only between both devices are discussed here. The light-source lamp unit 1A of the present invention has surfaces 52A–55A, which may be selectively set to be reflective or non-reflective, as the lamp-information storing block 5A, instead of using the jumper wires B1–B4. The lamp unit mount 105A has a sensing block 109 constructed of four pairs of photocouplers 109-1 through 109-4 facing respectively the surfaces 52A–55A in a non-contact fashion. The output ends of the photocouplers are respectively connected to input ports P1–P4 on CPU 101. In this modification, as shown, surfaces 52A and 55A are set to be light reflective while the remaining surfaces 53A and 55A are set to be non-reflective. The outputs of the photocouplers 109-2 and 109-4 facing the reflective surface are driven low while the remaining photocouplers are kept high in level. Depending on the outputs, information about lamp type and characteristics obtained by four surfaces is sensed.

Since the information obtained by the lamp-information storing block 5A is optically sensed in a non-contact fashion in this modification, noise ingress to the input ports P1–P4 is less likely and reliability of the device is enhanced, compared to the sensing mechanism in the light-source lamp unit 1 where it is in a physically contact state. The reliability of the device is further enhanced in that no consideration is required for a trouble such as an erratic sensing arising from a physical contact failure.

(Second modification of the light-source device)

In the above light-source devices 100, 100A, the light-source lamp units 1, 1A mounted therein are constructed such that the lamp-information storing blocks 5, 5A store the lamp type (power rating) and lamp characteristics (new unit or not, and lamp life). A lamp-information storing block may be constructed of a nonvolatile memory, for example, to store more lamp information along with these pieces of information, or to permit an update of the lamp information.

In the light-source devices 100, 100A, the memory 107 in the device side stores the information about the type of light-source lamp unit that can be mounted on the lamp unit mounts 105, 105A, lamp power rating and operation time count. Alternatively, the lamp-information storing block in the light-source lamp unit may store the operation time count in an update-enabled fashion. The remaining lamp life may be stored there in an update-enabled fashion.

When an arrangement for storing the operation time count in an update-enable fashion is introduced in the design of the lamp-information storing, the light-source device retrieves the past operation time count from the light-source lamp unit, and counts continuously the operation time while the light-source lamp unit is operated, and after use, the resulting operation time count is used to update the operation time count stored in the light-source lamp unit. Likewise, when an arrangement for storing the remaining life time of the lamp in an update-enabled fashion is introduced in the design of the lamp-information storing, the light-source device retrieves the remaining life time from the light-source lamp unit, and counts continuously the operation time while the light-source lamp unit is operated, and after use, a current remaining life obtained by subtracting the resulting operation time count from the past remaining life is used to update the remaining life stored in the light-source lamp unit.

In this way when the light-source lamp unit is provided with the light-information storing for storing the lamp operation time count or the remaining life time in an update-enabled fashion, the memory capacity of the light-source device is accordingly reduced, and if a plurality of light-source lamp units of the same type are concurrently operated, the light-source device always determines the lamp lives to present a proper warning display, and the life determination is accurately performed. When a light-source lamp unit of the same type that was used in another light-source device is mounted in the above-described light-source devices 100, 100A, the operation time count stored in the memory 107 is not for the one now mounted, and an erroneous sensing of lamp life may result. Since the light-source lamp unit itself holds the operation time count and the remaining life time of the light-source lamp unit in this modification, the light-source device always and properly determines the lamp life.

(Projection-type display apparatus)

A projection-type display apparatus in which the present invention is implemented is now discussed. The projection-type display apparatus separates a white light beam from the light-source device 100, constructed according to the present invention, into red, blue and green light beams, passes each color light beam through a respective light valve constructed of a liquid-crystal panel to modulate each light beam in accordance with image information, synthesizes the modulated color light beams and enlarges and projects them through a projection lens onto a screen.

(General construction)

Figure 11:
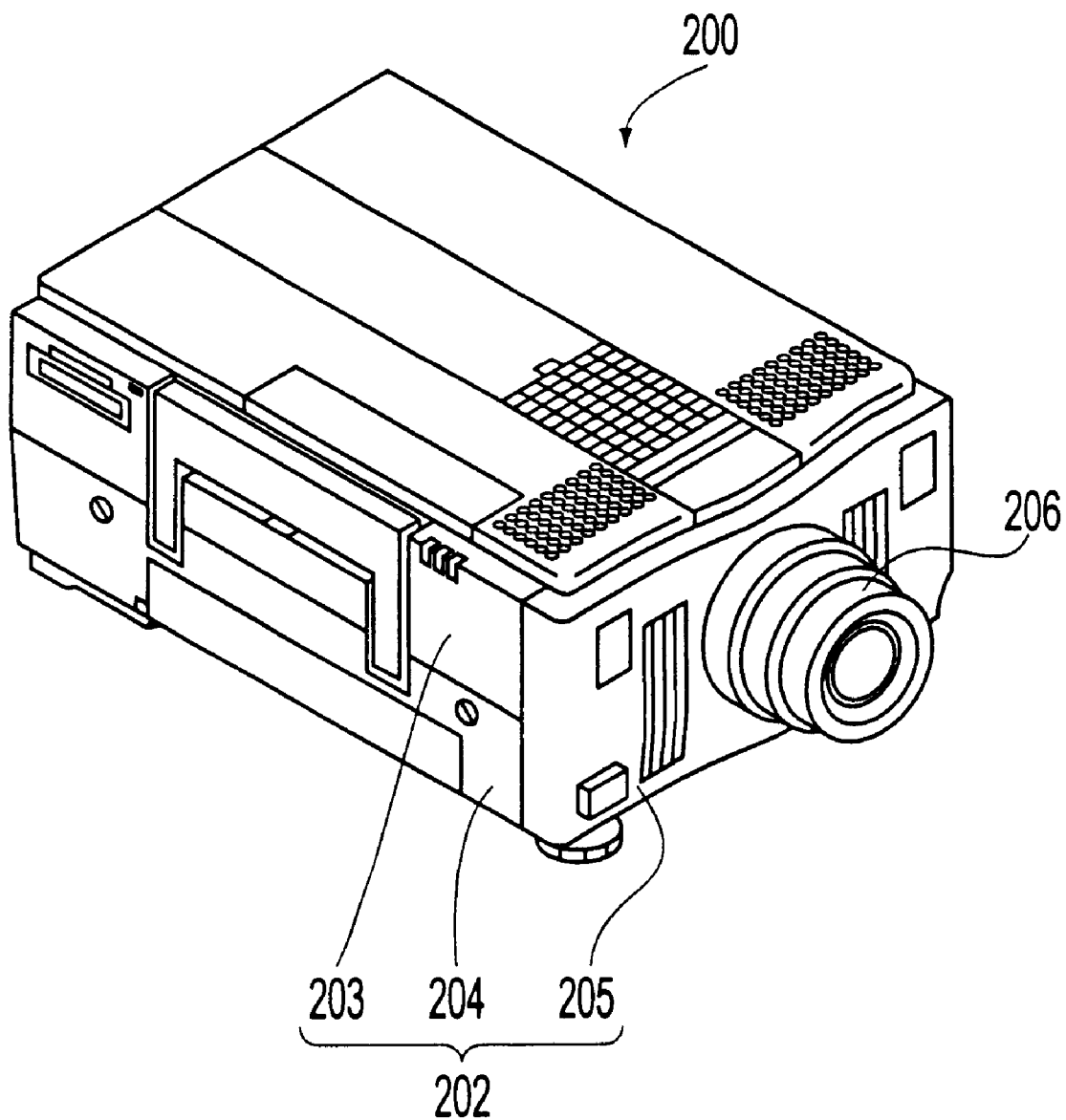
FIG. 11 is an external view of a projection-type display apparatus in which the present invention is implemented.

FIG. 11 is an external view of the projection-type display apparatus of one embodiment of the present invention. The projection-type display apparatus 200 has a rectangular parallelopiped, outer casing 202. The outer casing 202 is basically constructed of an upper case 203, a lower case 204, and a front case 205 that defines the front of the apparatus. The front portion of a projection lens unit 206 is projected out of the center of the front case 205.

Figure 12A:
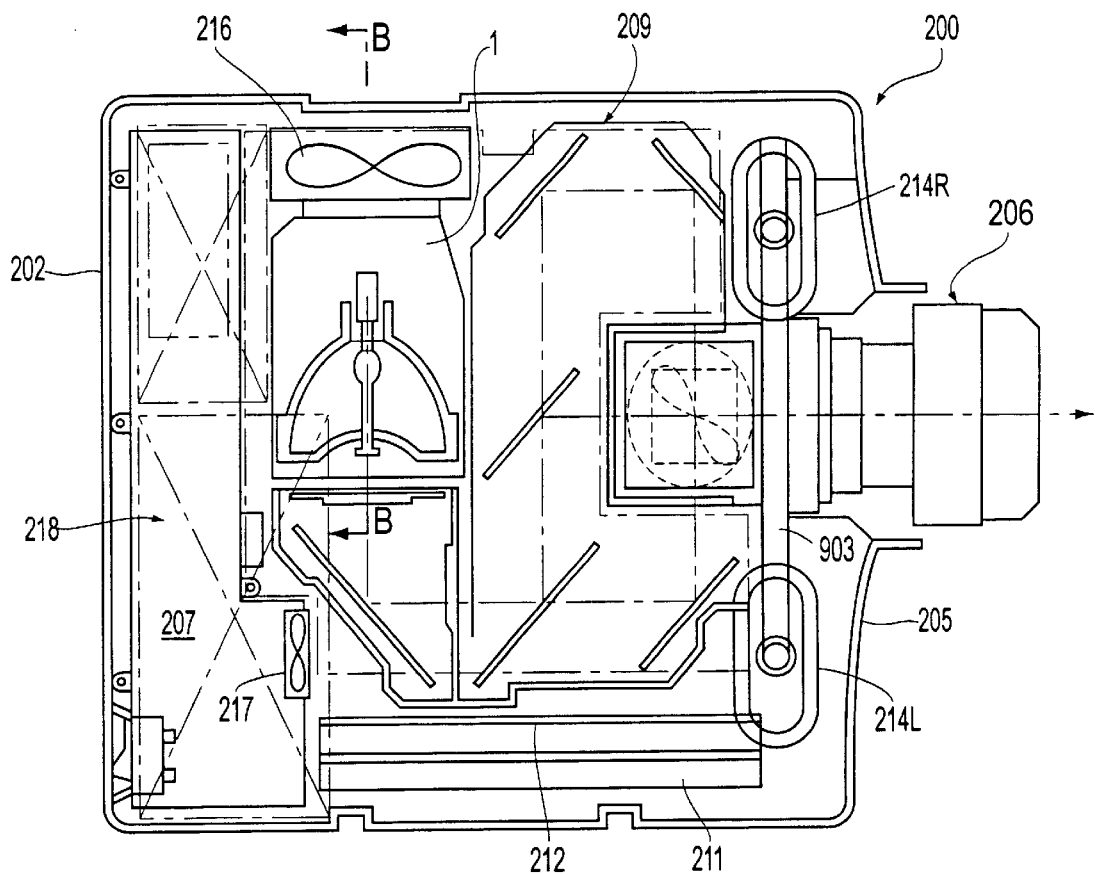
FIG. 12(A) is a plan view showing the internal structure of the projection-type display apparatus.
Figure 12B:
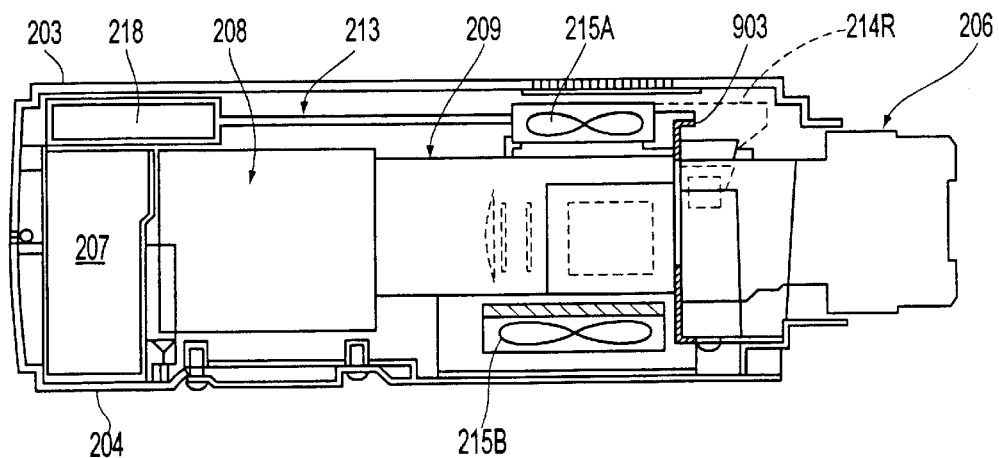
FIG. 12(B) is a sectional view of the projection-type display apparatus.

FIG. 12 shows the positional relationship of components inside the outer casing 202 of the projection-type display apparatus 200. As shown, a power supply unit 207 including the lamp regulator 104 is housed in the rear portion inside the outer casing 202. Arranged in front of the power supply unit 207 is a light-source lamp unit 1 of the light-source device 100 of the present invention. An optical unit 209 is also arranged in front. The projection lens unit 206 is mounted with its base end portion positioned at the center front of the optical unit 209. Disposed on one side of the optical unit 209 is an interface board 211 having an input/ output interface circuit thereon which extends from front to back in the casing, and a video board 212 having a video signal processing circuit thereon extends in parallel with the interface board 211. A control board 213 for driving and controlling the apparatus is mounted above the light-source lamp unit 1 and optical unit 209. The control board 213 has a control circuit (see FIG. 4) for driving the lamp thereon. Loudspeakers 214R, 214L are respectively installed on the left-front and right-front corners in the apparatus.

A suction fan 215A for cooling is installed on the center of the top surface of the optical unit 209, and a circulating fan 215B for forming circulating cooling air flow is attached on the center of the underside of the optical unit 209. Furthermore, an exhaust fan 216 is attached to the rear side of the light-source lamp unit 208 facing, from inside, one side of the apparatus. Disposed on one side of the power supply unit 207 close to the rear ends of the boards 211, 212 is an auxiliary cooling fan 217 for sucking in cooling air flow from the suction fan 215A into the power supply unit 207.

Disposed on top of the power supply unit 207 on the left-hand side of the apparatus is a floppy disk drive unit (FDD) 218.

Optical Unit and Optical System

Figure 13:
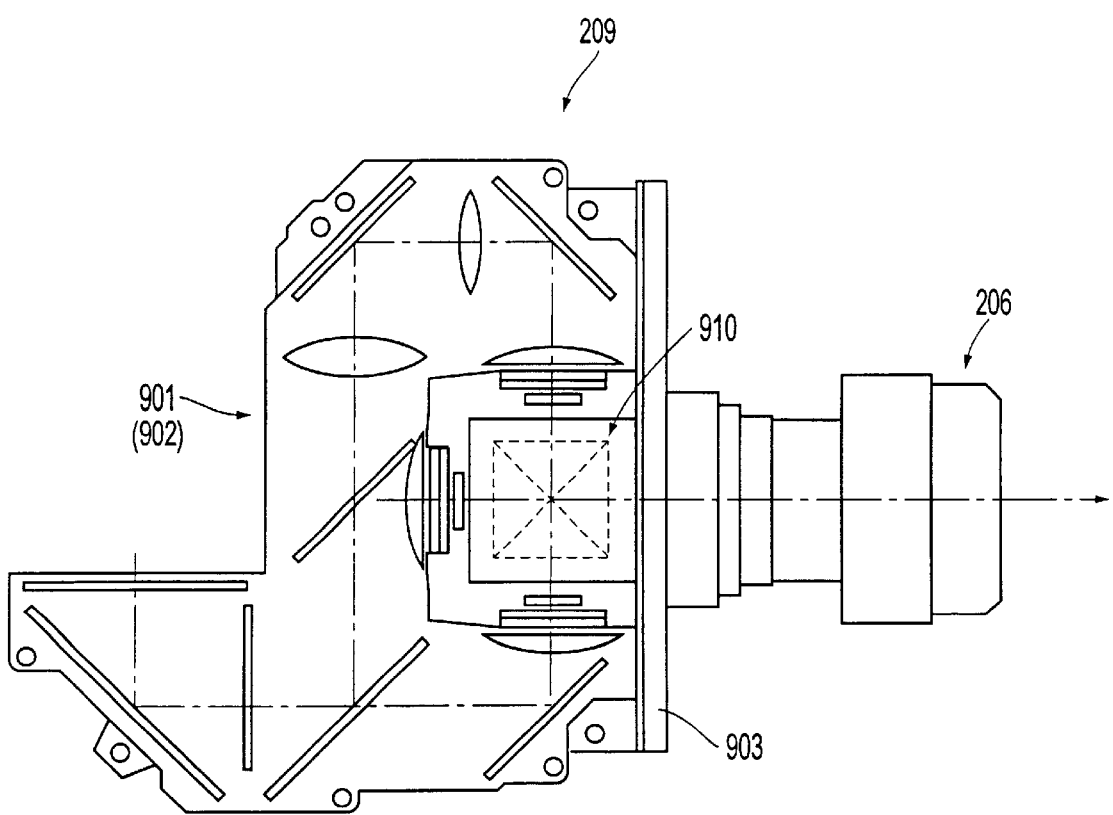
FIG. 13 is a plan view showing an optical unit and a projection-lens unit dismounted.

FIG. 13 shows the optical unit 209 and projection lens unit 206 dismounted from the casing. As shown, the optical unit 209 has optical elements, except a prism unit 910, constituting color synthesizing means, interposed between upper and lower light guides 901, 902. The upper light guide 901 and lower light guide 902 are respectively secured to the upper case 203 and lower case 204 using fixing screws. The upper and lower light guides 901, 902 are also secured to sides of the prism unit 910 using fixing screws. The prism unit 910 is secured to the inside of a thick, diecast head plate 903 using fixing screws. The base section of the projection lens unit 206 is bolted to the front side of the head plate 903.

Figure 14A:
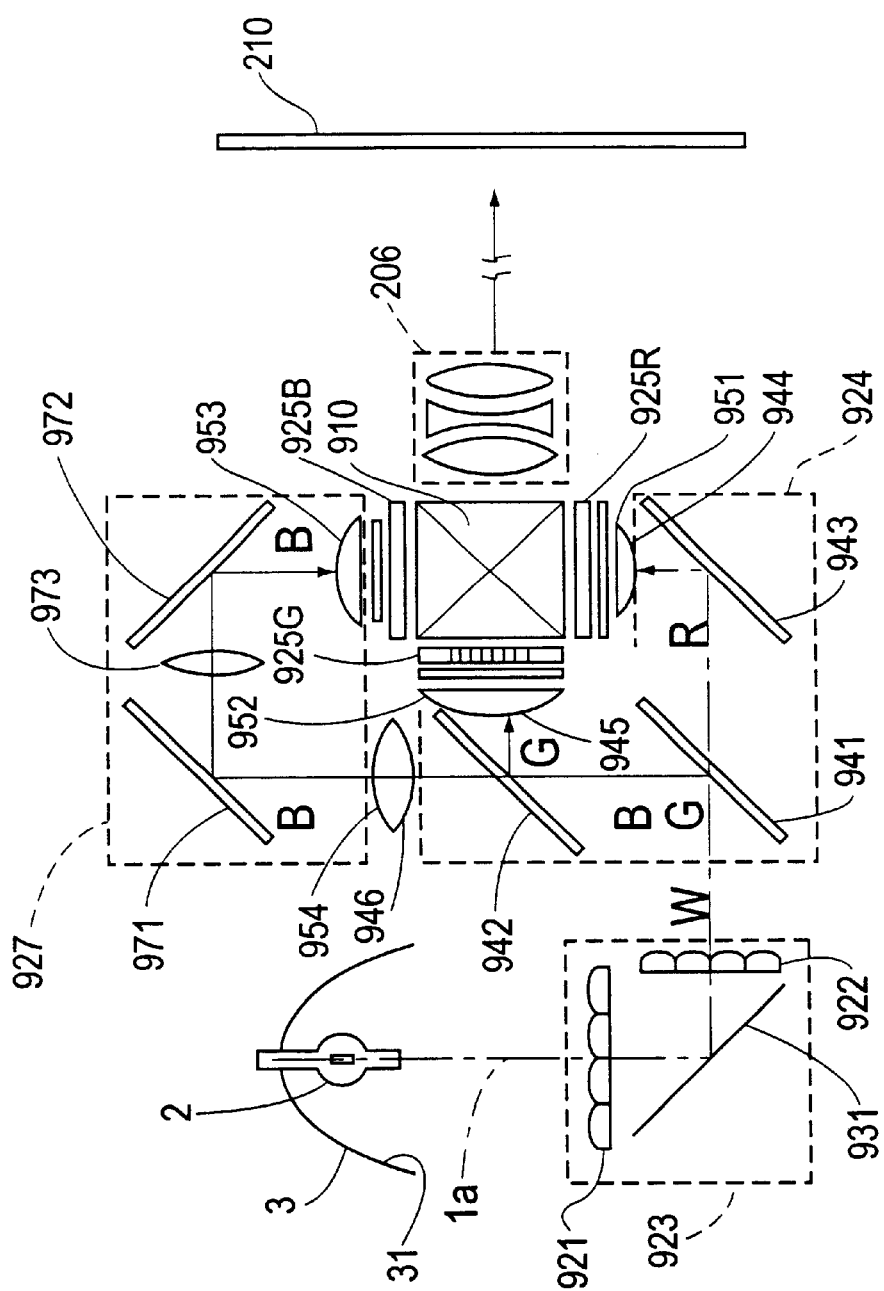
FIG. 14(A) is a diagram showing the optic system incorporated in the optical unit.

FIG. 14(A) generally shows an optical system assembled into the optical unit 209. Referring to FIG. 14(A), the optical system assembled into the optical unit 209 is discussed. The optical system of this embodiment comprises a light-source lamp 2 that is an element constituting the light-source lamp unit 1, and an illumination optical system 923 including an integrator lens 921 (first lens plate) and an integrator lens 922 (second lens plate), as uniform illumination optical elements. The optical system further comprises a color separating optical system 924 for separating a white light beam W emitted from the illumination optical system 923 into red, green and blue color light beams R, G, and B, three liquid-crystal light valves 925R, 925G, and 925B as light valves for respectively modulating the color light beams, the prism unit 910 as a color synthesizing optical system for synthesizing modulated color light beams, and the projection lens unit 206 for enlarging and projecting the synthesized light beam to the surface of a screen 210. Also provided is a light guide system 927 for guiding to a liquid-crystal light valve 925B the blue color light beam B out of the color light beams separated by the color separating optical system 924.

A halogen lamp, a metal halide lamp or a xenon lamp may be used as the lamp 2. The uniform illumination optical system 923 is provided with a reflection mirror 931, which bends at a right angle the central optical axis la of the output light from the illumination optical system toward the front of the apparatus. The integrator lenses 921, 922 are arranged to be perpendicular to each other with the mirror 931 arranged therebetween.

The output light from the lamp 2 passing through the integrator lens 921 is directed to the surface of incidence of each lens constituting the integrator lens 922 as a secondary light source image, and the exit light from the integrator lens 922 illuminates an object to be illuminated.

The color separating optical system 924 comprises a blue/green-reflecting dichroic mirror 941, a green-reflecting dichroic mirror 942, and a reflecting mirror 943. The blue light beam B and the green light beam G contained in the white light beam W are first reflected at a right angle off the blue/green-reflecting dichroic mirror 941 toward the green-reflecting mirror 942.

The red light beam R passes through the blue/green-reflecting dichroic mirror 941, is reflected at a right angle off the reflecting mirror 943 downstream thereof, and is delivered toward the prism unit 910 via the exit section 944 for the red light beam. The green light beam G only out of the blue and green light beams B and G reflected off the mirror 941 is reflected at a right angle off the green-reflecting mirror 942, and is delivered toward the prism unit 910 via the exit section 945 for the green light beam. The blue light beam B passing through the mirror 942 is delivered toward the light guide system via the exit section 946 for the blue light beam. In this embodiment, the distances from the exit section of the white light beam of the inform illumination optical system respectively to the exit sections 944, 945, and 946 in the color separating optical system 924 are set to be equal.

Converging lenses 951, 952, 954 are respectively arranged to the exit sides of the exit sections 944, 945 and 946 for the three colors in the color separating optical system 924. These color light beams from the respective exit sections 944, 945, are made parallel through the converging lenses 951, 952.

The red and green light beams R, G, out of the color light beams R, G, and B made parallel in this way, are respectively introduced into the liquid-crystal light valves 925R, 925G to be modulated there, and image information is imparted to each color light beam. More particularly, these light valves are switching-controlled by the image information by unshown driving means, and the color light beams passing therethrough are thus modulated. Any of known means may be used as the driving means herein. The blue light beam B, on the other hand, is guided to the liquid-crystal light valve 925B via the light guide system 927, where it is likewise modulated according to the image information. The light valves in this embodiment may be the one that employs a polysilicon TFT as a switching element.

The light guide system 927 comprises an input reflecting mirror 971, an output reflecting mirror 972, an intermediate lens 973 disposed between these mirrors, and a converging lens 953 disposed in front of the liquid-crystal panel 925B. Among the lengths of the optical paths of the color light beams from the light-source lamp 2 to the respective liquid-crystal panels, the length of the optical path of the blue light beam B is the longest, and thus the blue light beam suffers a maximum loss. By arranging the light guide system 927, however, the light loss the blue light beam suffers is restricted.

The color light beams modulated through the respective liquid-crystal light valves 925R, 925G, and 925B are introduced into the color synthesizing optical system 910 to be synthesized there. In this embodiment, the prism unit 910 of a dichroic prism constitutes the color synthesizing optical system. A color image synthesized here is enlarged and projected through the projection lens unit 6 to the screen 210 at a predetermined position.

(Mount of the light-source lamp unit)

Figure 15:
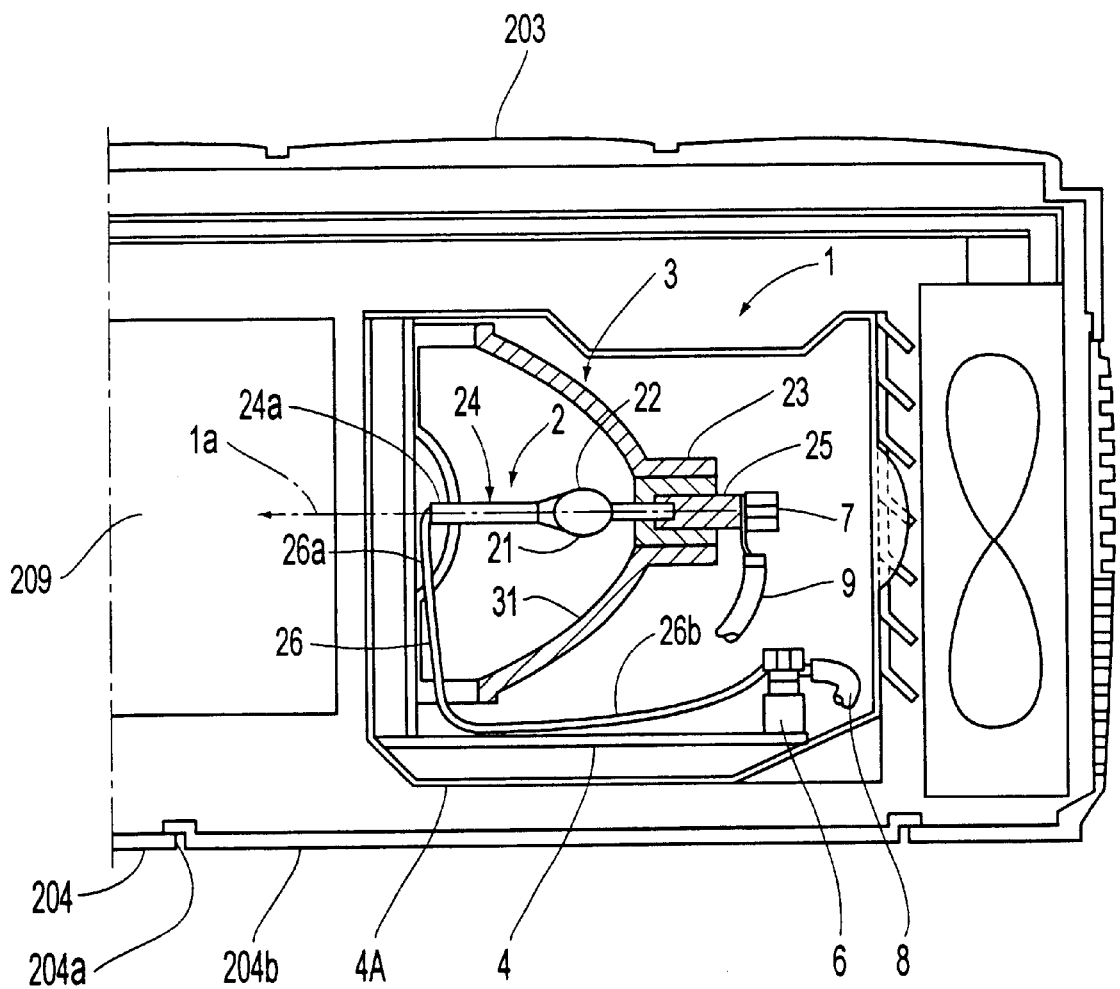
FIG. 15 is a cross-sectional view of the light-source lamp unit taken along a line B—B in FIG. 12.

FIG. 15 is a cross-sectional view of the light-source lamp unit 1, taken along a line B—B in FIG. 12. As may be seen from FIGS. 1, 2 and 15, the lamp unit mount formed on the side of the projection-type display apparatus is constituted by a lamp outer housing 4A. The lamp housing 4 of the light-source lamp unit 1 is detachably mounted in the outer housing 4A. The lower case 204 has an opening 204a, which is normally closed by a lid 204b. With the lid 204b opened, the light-source lamp unit 1 is mounted to and dismounted from the outer housing 4A through the opening 204a.

In the projection-type display apparatus 200 thus constructed, the light-source device 100 constantly counts the operation time of the light-source lamp unit 1, compares the operation time count with the lamp life, and forcibly extinguishes the lamp when its life expires. When the operation time count reaches the lamp life time minus a predetermined time, for example, minus 100 hours, the light-source device 100 carries out a warning display control such as presenting a display prompting for a lamp replacement (see the flow diagrams in FIGS. 6 through 9). A color balance drop and brightness drop of a projected image arising from the continuous use of the light-source lamp into its life-expired state are avoided. Since the warning display advising that a lamp replacement is needed is presented prior to the occurrence of such problems, the user can conveniently learn about an approaching life expiration before the lamp actually expires.

In one form of the warning display control to warn that a lamp is expected to expire soon, the brightness of the projected image is changed. More particularly, from when the operation time count exceeds the life minus a predetermined time, for example, minus 100 hours, to when the lamp life expires, the projected image is forced to its reduced brightness state, and from such a brightness change, the user learns that the lamp life will expire soon. Alternatively, an image of lamp may be presented at one corner of the projected image or somewhere else as a warning display.

Referring to FIGS. 1 and 2, of the lead 26 led out of the end 24a of the emission tube 21 of the light-source lamp unit 1, the portion 26a in front of the reflective mirror 3 is generally routed vertically downward. This arrangement offers the following advantages.

Figure 14B:
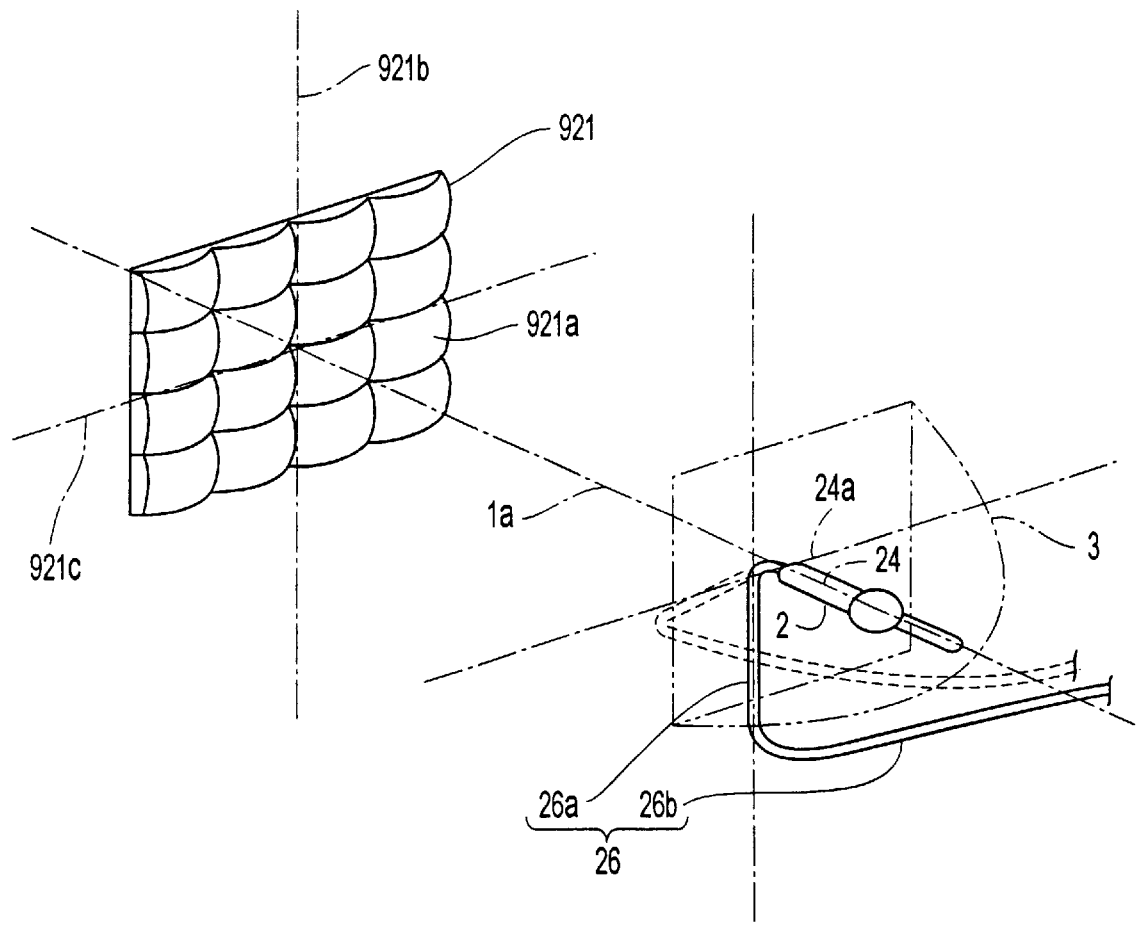
FIG. 14(B) is an explanatory diagram showing the integrator in a uniform illumination optical system of the optical unit.

FIG. 14(B) shows the positional relationship between the integrator lens 921 and the lead 26. The integrator lens 921 constituting the uniform illumination optical system is constructed of a number of rectangular lenses 921a spliced in an array extending vertically and horizontally. The center of the integrator lens 921 is typically optically aligned with the center of the lamp 2. If the lead 26 is vertically oriented, it will be aligned with a splicing line 921b (a groove of the lens structure) of rectangular lenses 921a in the integrator lens 921. As a result, the shadow of the lead 26 is not projected on the rectangular lenses 921a of the integrator lens 921. With this arrangement, uniform illumination free from the shadow of the lead 26 is achieved.

It will be perfectly acceptable if the lead 26 is routed upward along the splicing line 921b of the rectangular lenses 921a. Alternatively, the lead 26 may be routed leftward or rightward horizontally across the integrator lens 921 along the splicing line 921c of the rectangular lenses 921a. If the splicing line is tilted at a certain angle to the horizontal or vertical, the lead 26 may be routed along that tilted splicing line.

The projection-type display apparatus to which the present invention may be implemented is not limited to the above example, and may be the one having a different optical system. Besides the projection-type display apparatus discussed above in which an image is projected to the screen from the viewing side of the screen, a rear-projection-type for projecting an image from the side opposite the viewing side of the screen is available. The light-source device of the present invention is applied to such a rear-projection-type display apparatus.

As described above, the light-source lamp unit of the present invention includes the lamp-information storing means for storing the information about the type and characteristics of the light-source lamp. The light-source device of the present invention includes the sensing means for sensing the information obtained by the lamp-information storing means, and the drive and control means for driving and controlling the light-source lamp to light it based on the information sensed by the sensing means. According to the present invention, based on the lamp power rating and lamp life obtained by the lamp-information storing means, the light-source lamp is lit at the driving condition appropriate to the mounted light-source lamp unit. The expiration of life of the lamp in the mount light-source lamp unit is accurately determined. The light-source device having compatibility with light-source lamps of different types is provided.

Since the projection-type display apparatus of the present invention has the light-source device thus constructed, it works with light-source lamps of different types and different power ratings as necessary depending on working environments. Even if a light-source lamp of a different type is mounted, the time of life expiration of the lamp is accurately determined, and problems including color balance drop and brightness drop of the projected image arising from the continuous use of the light-source lamp into its life-expired state are reliably precluded.

Since the lead that is led out of the one end of the electrode core bar of the light-source lamp is routed rearward around the reflective mirror rather than through the reflective mirror in the light-source lamp unit of the present invention, no through-hole for passing the lead therethrough is required in the reflective mirror, and unlike the conventional art, the reflective surface is free from a deformation around a through-hole in the formation process of the reflective mirror or in the routing process of the lead rearward through the through-hole drilled in the reflective surface. The lead routed to the rear side of the reflective mirror is connected to a terminal board for external connection mounted on the housing. When the terminal board is fixed on the rear surface of the reflective mirror as in the conventional art, the mounting portion for the terminal board is exposed to high temperature from the lamp lit, thermal stress takes place there due to differing thermal expansion coefficients between the glass forming the reflective mirror and the metal material of the terminal board, and a crack may develop there, possibly leading to a break. In the present invention, the terminal board is mounted on the housing rather than on the reflective mirror, no such damage occurs.

What is claimed is:

1. A light-source lamp unit comprising:

a light-source lamp;

a lamp-information storing device that stores lamp information about the light-source lamp; and the lamp-information storing device comprising a fuse which indicates by one of a melted-open state and a non-melted open state whether the light source lamp is a new light-source lamp.

2. The light-source lamp unit of claim 1, wherein the lamp-information storing device stores lamp information indicating a remaining life of the light-source lamp.

3. The light-source lamp unit of claim 1, wherein the lamp-information storing device stores lamp information indicating a life of the light-source lamp at a moment of a first use of the light-source lamp and lamp information indicating an operation time count of the light-source lamp.

4. The light-source lamp unit of claim 1, wherein the lamp-information storing device stores lamp information indicating a power rating of the light-source lamp.

5. The light-source lamp unit of claim 1, further comprising:
- a reflective mirror that reflects a divergent light beam from the light-source lamp to output a parallel light beam;
- a lamp housing that supports the reflective mirror; and
- an electrode lead that is led out of an end of an emission tube of the light-source lamp that is projected forward out of a reflective surface of the reflective mirror and that is connected to an external connection terminal board which is positioned to a rear side of a reflective surface of the reflective mirror,
- wherein the electrode lead is routed via the portion of the reflective mirror other than an effective reflective area of the reflective mirror.

6. The light-source lamp unit of claim 5, wherein the terminal board is supported at a position other than the reflective surface of the reflective mirror.

7. The light source lamp unit of claim 1, wherein the lamp-information storage device stores information about a type of light-source lamp.

8. A light-source apparatus, comprising:
- a light-source lamp unit including a light-source lamp and a lamp information storing device that stores lamp information concerning whether the light-source lamp is a new light-source lamp, the lamp-information storing device including a fuse having one of a melted-open state and a non-melted open state indicating whether the light-source lamp is the new light-source lamp;
- a sensor that senses the information obtained by the lamp-information storing device; and
- a setting device that melts the fuse when the sensor senses that the light-source lamp is the new light-source lamp and further setting the information stored by the lamp-information storing device to be indicative of not the new light-source lamp.

9. The light-source apparatus of claim 8 further comprising:
- a counter that counts an operation time of the light-source lamp;
- a memory that stores an operation time count of the light-source lamp counted by the counter; and
- a comparing device that compares the operation time count with a preset time,
- wherein the light-source lamp is lit only when the operation time count is less than the preset time.

10. The light-source apparatus of claim 9, wherein the light-source lamp is extinguished when the operation time count exceeds the preset time.

11. The light-source apparatus of claim 8, further comprising a resetting device that resets the operation time count to an initial default value when the sensor senses that the light-source lamp is the new light-source lamp.

12. The light-source apparatus of claim 8, further comprising a luminance adjuster that adjusts the luminance of the light-source lamp when the sensor senses that the light-source lamp is the new light-source lamp.

13. A projector, comprising:
light-source lamp unit, including:
- a light-source lamp;
- a lamp-information storing device that stores lamp information about the light-source lamp; and
- the lamp-information storing device comprising a fuse which indicates by one of a melted-open state and a non-melted open state whether the light source lamp is a new light-source lamp;
- a modulating device that modulates an output light beam emitted by the light-source lamp unit; and
- a projection lens that projects an output light beam modulated by the modulating device to a projection surface.

14. The projector of claim 13, wherein the lamp-information storing device stores lamp information indicating a remaining life of the light-source lamp.

15. The projector of claim 13, wherein the lamp-information storing device stores lamp information indicating a life of the light-source lamp at a moment of a first use of the light-source lamp and lamp information indicating an operation time count of the light-source lamp.

16. The projector of claim 13, wherein the lamp-information storing device stores lamp information indicating a power rating of the light-source lamp.

17. The projector of claim 13, wherein the light-source unit further comprises:
- a reflective mirror that reflects a divergent light beam from the light-source lamp to output a parallel light beam;
- a lamp housing that supports the reflective mirror; and
- an electrode lead that is led out of an end of an emission tube of the light-source lamp that is projected forward out of a reflective surface of the reflective mirror and that is connected to an external connection terminal board which is positioned to a rear side of a reflective surface of the reflective mirror,
- the electrode lead is routed via the portion of the reflective mirror other than an effective reflective area of the reflective mirror.

18. The projector of claim 17, wherein the terminal board is supported at a position other than the reflective surface of the reflective mirror.

19. The projector of claim 13, wherein the lamp-information storage device stores information about a type of light-source lamp.

20. A projector, comprising:
a light source apparatus, including:
- a light-source lamp unit including a light-source lamp;
- a lamp information storing device that stores lamp information concerning whether the light-source lamp is a new light-source lamp, the lamp-information storing device including a fuse having one of a melted-open state and a non-melted open state indicating whether the light-source lamp is the new light-source lamp;
- a sensor that senses the information obtained by the lamp-information storing device; and
- a setting device that melts the fuse when the sensor senses that the light-source lamp is the new light-source lamp and further setting the information stored by the lamp-information storing device to be indicative of not the new light-source lamp;

a modulating device that modulates an output light beam emitted by the light-source lamp unit; and a projection lens that projects an output light beam modulated by the modulating device to a projection surface.

21. The projector of claim 20, wherein the light-source apparatus further comprises:

a counter that counts an operation time of the light-source lamp;

a memory that stores an operation time count of the light-source lamp counted by the counter; and a comparing device that compares the operation time count with a preset time, wherein the light-source lamp is lit only when the operation time count is less than the preset time.

22. The projector of claim 20, wherein the light-source lamp is extinguished when the operation time count exceeds the preset time.

23. The projector of claim 20, wherein the light-source apparatus further comprises a resetting device that resets the operation time count to an initial default value when the sensor senses that the light-source lamp is the new light-source lamp.

24. The projector of claim 20, wherein the light-source apparatus further comprises a luminance adjuster that adjusts the luminance of the light-source lamp when the sensor senses that the light-source lamp is the new light-source lamp.

* * * * *